United States Patent
Raghavan et al.

(10) Patent No.: US 8,464,188 B1
(45) Date of Patent: Jun. 11, 2013

(54) MULTI-RATE HIERARCHICAL STATE DIAGRAMS

(75) Inventors: Vijay Raghavan, Framingham, MA (US); Ebrahim Mehran Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 1347 days.

(21) Appl. No.: 11/210,538

(22) Filed: Aug. 23, 2005

(51) Int. Cl.
*G06F 17/50* (2006.01)
*G06F 9/45* (2006.01)

(52) U.S. Cl.
USPC ............ 716/100; 716/101; 716/103; 716/106

(58) Field of Classification Search
USPC . 716/1, 100, 101, 103, 106; 326/46; 717/105, 717/108, 109
See application file for complete search history.

(56) References Cited

U.S. PATENT DOCUMENTS

| | | | | |
|---|---|---|---|---|
| 5,617,327 | A * | 4/1997 | Duncan | 703/14 |
| 5,712,826 | A * | 1/1998 | Wong et al. | 365/226 |
| 5,894,420 | A * | 4/1999 | Duncan | 716/12 |
| 6,031,399 | A * | 2/2000 | Vu et al. | 327/96 |
| 6,163,876 | A | 12/2000 | Ashar et al. | |
| 6,625,797 | B1 * | 9/2003 | Edwards et al. | 716/18 |
| 6,718,533 | B1 * | 4/2004 | Schneider et al. | 717/100 |
| 6,865,429 | B1 * | 3/2005 | Schneider et al. | 700/86 |
| 6,880,147 | B1 | 4/2005 | Pauly | |
| 6,946,984 | B2 * | 9/2005 | Rubin et al. | 341/141 |
| 6,983,427 | B2 | 1/2006 | Wheeler et al. | |
| 7,058,142 | B2 | 6/2006 | Coene et al. | |
| 7,222,314 | B1 * | 5/2007 | Miller et al. | 716/103 |
| 7,275,237 | B1 * | 9/2007 | Schneider et al. | 717/108 |
| 7,277,748 | B2 * | 10/2007 | Wingeier et al. | 600/544 |
| 7,369,977 | B1 | 5/2008 | Clune et al. | |
| 7,503,027 | B1 * | 3/2009 | Zhao et al. | 716/18 |
| 7,603,651 | B2 | 10/2009 | De Brabander | |
| 2002/0140457 | A1 * | 10/2002 | Pratt et al. | 326/93 |
| 2003/0189993 | A1 | 10/2003 | Coene et al. | |
| 2003/0208289 | A1 * | 11/2003 | Ben-Arie | 700/61 |
| 2004/0059443 | A1 * | 3/2004 | Sharangpani | 700/48 |
| 2004/0158804 | A1 | 8/2004 | Hayles | |

(Continued)

FOREIGN PATENT DOCUMENTS

GB 2345360 7/2000

OTHER PUBLICATIONS

International Search Report for Application No. PCT/US2006/032855, dated Feb. 13, 2007.

*Primary Examiner* — Sun Lin
(74) *Attorney, Agent, or Firm* — Nelson Mullins Riley & Scarborough LLP

(57) ABSTRACT

Systems and methods are provided for a scheme and mechanism for performing static analysis of a sample time aware state diagram model to compute and propagate multiple samples rates associated with the state diagram model. A graphical intermediate representation of the state diagram model, such as a directed graph or control flow graph, is used to determine how the multiple sample rates are propagated via elements of the state diagram model. The graph provides a static representation of the control of flow, including alternative and/or conditional flow paths, of the state diagram model. The present invention determines the propagation of sample rates via analysis and traversal of the intermediate representation. By using the techniques of the present invention, a state diagram model may provide multiple sample rate outputs, such as by function calls and output signals to a graphical model, such as a model representing a dynamic system.

56 Claims, 10 Drawing Sheets

U.S. PATENT DOCUMENTS

| | | |
|---|---|---|
| 2004/0210592 A1 | 10/2004 | Ciolfi et al. |
| 2006/0156294 A1* | 7/2006 | Fuller et al. .................. 717/154 |
| 2006/0168182 A1* | 7/2006 | Fuller et al. .................. 709/223 |
| 2006/0168183 A1* | 7/2006 | Fuller et al. .................. 709/223 |
| 2006/0190105 A1* | 8/2006 | Hsu et al. ...................... 700/86 |
| 2006/0235548 A1* | 10/2006 | Gaudette ........................ 700/83 |
| 2007/0157162 A1* | 7/2007 | Ciolfi ............................ 717/105 |
| 2007/0283322 A1* | 12/2007 | Hsu et al. ..................... 717/113 |

* cited by examiner

MULTI-RATE HIERARCHICAL STATE DIAGRAMS

TECHNICAL FIELD

The present invention generally relates to propagating multiple samples rates in a state diagram model.

BACKGROUND INFORMATION

State diagram models, such as state diagrams produced with Stateflow® from The MathWorks, Inc. of Natick, Mass., are event-based and therefore reactive without any notion of time. In contrast, graphical modeling and simulation tools, such as Simulink® also from The MathWorks, Inc., provide dynamic system modeling and simulation to represent and propagate multiple sample times or rates for different components in a system. Designing and simulating with multiple samples rates for different components of the system provides for testing to ensure the integrity of data access between the different components In some cases, state diagrams may be used to schedule the execution of different components in a graphical model or simulation of the system. For example, in state diagrams of Stateflow®, temporal operators and function call outputs may be used to trigger execution of different components in a Simulink® graphical model.

While the schedulers implemented using a state diagram model allow for a variety of scheduling designs, a state diagram model does not provide for propagating multiple samples rates to drive the scheduling, triggering or execution of the different components of a simulated system. The reactive event-based nature along with the Turing-complete nature of a state diagram model, such as a Stateflow® diagram, makes it challenging to propagate the sample times to the component subsystems. Additionally, state diagram based schedulers do not execute different components of the system based on different sample rates. As such, state diagram models integrated or interfacing with a graphical model of a system for simulation limits the design, simulation and testing of various different components via multiple sample rates.

SUMMARY OF THE INVENTION

The present invention provides systems and methods for processing and/or propagating multiple sample rates via a state diagram model, such as Stateflow®. The state diagram model may receive or process multiple input signals having different sample rates, and the state diagram model may also use temporal operators related to input signals that alter the propagation of sampling rates. Additionally, the state diagram model may be sample time aware by configuring or specifying sample rates for different elements of the state diagram model, such as assigning a sample rate to one or more states of the state diagram model.

The techniques of the present invention provide a scheme and mechanisms for static analysis of a state diagram model to compute and propagate multiple samples rates associated with the state diagram model. In one embodiment of the present invention, a graphical intermediate representation of the state diagram model, such as a directed graph or control flow graph, is used to determine how the multiple sample rates are propagated via elements of the state diagram model. The graph provides a static representation of the control of flow, including alternative and/or conditional flow paths, of the state diagram model. The present invention determines the propagation of sample rates via analysis and traversal of the intermediate representation. By using the techniques of the present invention, a state diagram model may provide multiple sample rate outputs, such as by function calls and output signals to a graphical model, such as Simulink®. For example, a Stateflow® diagram may be used with a Simulink® graphical model to provide for scheduling or execution of different components of the graphical model for simulation. Using the techniques of the present invention, the Stateflow® diagram may provide different sample rates for triggering or executing the graphical model components via output functions or output signals.

In one aspect, the present invention is related to a method for processing a state diagram model to provide an executable form of the state diagram model propagating a plurality of rates associated with the state diagram model. The rates may comprise a sample rate, execution rate, or a data rate. The method includes providing a state diagram model having one or more elements and a plurality of rates associated with the one or more elements. The plurality of rates includes a first rate and a second rate, and the second rate may be different than the first rate. The method of the present invention processes the state diagram model to provide an executable form of the state diagram model representing a propagation of the plurality of rates via the one or more elements. The executable form represents a first portion of the state diagram model using the first rate and a second portion of the state diagram model using the second rate.

In another aspect, the method of the present invention provides at least one of the plurality of rates via a portion of a signal provided as an input to the one or more elements of the state diagram model. The method may also provide an executable instruction associated with the state diagram model to provide at least one of the plurality of rates by changing a frequency of one of a propagation of a signal or a calling of an output function. Additionally, the method may assign a rate of the plurality of sample rates to one or more states of the state diagram model.

In one aspect of the present invention, the method processes the state diagram model by generating a graphical representation of a flow of execution of the state diagram model. The graphical representation may include a directed graph or a control flow graph. The method may process the graphical representation to determine from the plurality of rates a rate to apply for one of an output signal or output function of the state diagram model.

In an additional aspect of the present invention, the state diagram model is provided via a graphical model that incorporates or references the state diagram model. The first portion of the state diagram model using the first rate or the second portion of the state diagram model using the second rate may be associated with or otherwise provide an output to a graphical model, such as a block diagram model. In one aspect, the method of the present invention may process the state diagram model into the executable form by generating code representing the state diagram model and compiling the code into an executable file.

In another aspect, the present invention relates to a device readable medium having device readable instructions to execute the steps of the method, as described above, related to processing a state diagram model to provide an executable form of the state diagram model propagating a plurality of rates associated with the state diagram model.

In a further aspect, the present invention relates to transmitting via a transmission medium computer data signals representing device readable instructions to execute the steps of the method, as described above, related to processing a state diagram model to provide an executable form of the state diagram model propagating a plurality of rates associated with the state diagram model.

In one aspect, the present invention is related to a method for executing a state diagram model to propagate multiple rates, such as a sample rate, an execution rate, or a data rate. The method includes providing an executable form of a state diagram model. The executable form represents a propagation of multiple rates via one or more elements of the state diagram model. The method includes executing the executable form to use a first rate of the multiple rates for a first portion of the executable form and a second rate of the multiple rates for a second portion of the executable form.

In another aspect of the present invention, the method includes propagating a first input signal having the first rate and propagating a second input signal having the second rate. The first rate or the second rate may be used for an output signal or an output function of the state diagram model. In an additional aspect, the one or more elements of the state diagram model represent a first state assigned the first rate or a second state assigned the second rate.

In other aspects of the present invention, executing the executable form of the state diagram model provides a simulation of the state diagram model.

In an additional aspect of the present invention, the executable form of the state diagram model is provided via an executable form of a graphical model that may incorporate or reference the state diagram model. An output to a graphical model, such as a block diagram model, may be provided by the first portion of the state diagram model using the first rate or the second portion of the state diagram model using the second rate. In other aspects, the method of the present invention may provide the executable form of the state diagram model by generating code representing the state diagram model and compiling the code into an executable file.

In one aspect, the present invention relates to a device readable medium having device readable instructions to execute the steps of the method, as described above, related to executing a state diagram model to propagate multiple rates.

In a further aspect, the present invention relates to transmitting via a transmission medium computer data signals representing device readable instructions to execute the steps of the method, as described above, related to executing a state diagram model to propagate multiple rates.

In one aspect, the present invention is related to a system for processing a state diagram model to propagate a plurality of rates associated with one or more elements of the state diagram model. The rates may include a sample rate, execution rate, or data rate. The system includes a state diagram model having a plurality of rates associated with one or more elements of the state diagram model. The plurality of rates has a first rate and a second rate. The second rate may be different than the first rate. The system also includes a processing tool to provide an executable form of the state diagram model representing a propagation of the plurality of rates via the one or more elements of the state diagram model. The executable form represents a first portion of the state diagram model using the first rate and a second portion of the state diagram model using the second rate.

In an additional aspect of the system of the present invention, the state diagram model includes a signal having a rate provided as input to the one or more elements. The state diagram model may also include an executable instruction providing one of the plurality of rates by changing a frequency of a propagation of a signal via the one or more elements. Additionally, the state diagram model may include one or more states assigned one or more of the plurality of rates. The one or more elements may represent a first state assigned the first rate or a second state assigned the second rate.

In a further aspect, the processing tool of the present invention generates a graphical representation of a flow of execution of the state diagram model. The graphical representation may include a directed graph or a control flow graph. The processing tool may use the graphical representation to determine from the plurality of samples rates a rate to apply for one of an output signal or an output function of the state diagram model. Also, the processing tool may propagate a first input signal having the first rate and propagate a second input signal having the second rate.

In another aspect of the present invention, the processing tool provides an executable form to use the first rate for a first portion of the executable form and the second rate for a second portion of the executable form. In some aspects, the processing tool applies the first rate or the second rate to an output signal or an output function of the state diagram model. The executable form may be executed to provide a simulation of the state diagram model.

In aspect of the system of the present invention, an executable form of a graphical model may include the executable form of the state diagram model. An output may be provided to the graphical model by executing the first portion of the state diagram model using the first rate or the second portion of the state diagram model using the second rate. In another aspect, the processing tool of the present invention may include a code generator for generating code representing the state diagram model and compiling the code into an executable file.

In further aspects, the system of the present invention may be distributed and/or executed on one or more computing devices. In one aspect, the state diagram model is provided via a first computing device and the processing tool executes on a second computing device. In another aspect, a first portion or a second portion of the executable form executes on either a first computing device or a second computing device.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1:
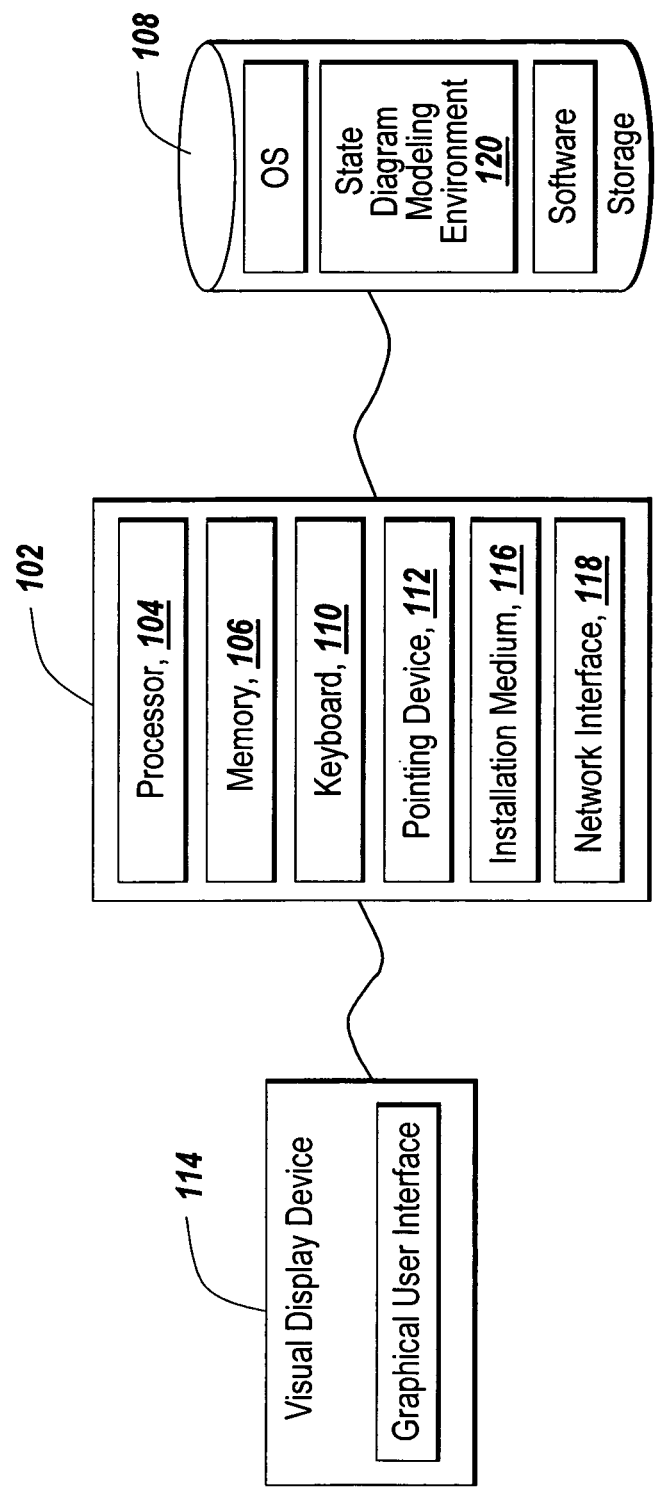
FIG. 1 is a block diagram of an illustrative computing device for practicing an embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the present invention provides systems and methods for processing and/or propagating multiple sample rates associated with a state diagram model. In one embodiment, the state diagram model may receive or process multiple input signals having different sample rates. For example, the state diagram model may receive one or more input signals having different sampling rates from a graphical or simulation model. In other embodiments, the state diagram model may include one or more temporal operators that provide event based occurrence and conditional based triggering of functionality. As such, temporal operators may provide multiple sample rates via processing, propagation, or processing of operations of the state diagram model. For example, temporal operators may provide for different frequencies of propagation of input signals to the output signal or for calling an output function to trigger a component of a simulation system. Additionally, the state diagram model may be sample time aware by configuring or specifying sample rates for different elements of the state diagram model, such as states represented by the state diagram model. For example a first state of the state diagram model may be configured to execute at a first rate while a second state may be configured to execute at a second sample rate.

The techniques of the present invention provide a scheme and mechanisms for static analysis of a state diagram model to compute and propagate multiple samples rates associated with the state diagram model. The illustrative embodiment may be performed during compilation or processing of the state diagram model into an executable form. The illustrative techniques of the present invention provides an intermediate representation of the state diagram model, such as a directed graph or control flow graph, to determine how the multiple sample rates are propagated via elements of the state diagram model. The directed or control flow graph provides a static representation of the control of flow, including alternative and/or conditional flow paths, of the state diagram model. Via the traversal and analysis of samples rates through the static intermediate representation, the present invention determines the propagation of sampling rates to provide for execution and output of an executable form of the state diagram model.

By using the techniques of the illustrative embodiment of the present invention, a state diagram model may provide multiple sample rate outputs, such as by function calls and output signals to a graphical model, such as Simulink® For example, a Stateflow® diagram may be used with a Simulink® graphical model to provide for scheduling or execution of different components of the graphical model for simulation. The Stateflow® diagram may provide different sample rates for triggering or executing the graphical model components via output functions or output signals. Furthermore, the execution of the state diagram model may be sample time aware so that elements such as states execute and process operations according to their assigned samples rates. As such, the state diagram model can be reactive and event-based and also execute in a sample time aware manner.

The illustrative embodiment will be described solely for illustrative purposes relative to a state diagram and graphical modeling environment provided by the software products from The MathWorks, Inc. of Natick, Mass. Although the illustrative embodiment will be described relative to a Stateflow® and/or Simulink®-based application, including the use of MATLAB®, one of ordinary skill in the art will appreciate that the present invention may be applied to other state diagram model and/or graphical modeling environments, such as any environment using software products of LabVIEW® or MATRIXx from National Instruments, Inc., MSC.Adams® from MSC.Software Corporation of Santa Ana, Calif., Virtuoso from Cadence of San Jose, Calif., Dymola from Dynasim AB of Lund, Sweden, Rational Rose from IBM of White Plains, N.Y., Mathematica® from Wolfram Research, Inc. of Champaign, Ill., Mathcad from Mathsoft Engineering & Education Inc., or Maple™ from Maplesoft, a division of Waterloo Maple Inc.

FIG. 1 depicts an environment suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may be used to display a graphical user interface (GUI).

The computing device 102 may include other I/O devices such a keyboard 110 and a pointing device 112, for example a mouse, for receiving input from a user. Optionally, the keyboard 110 and the pointing device 112 may be connected to the visual display device 114. Additionally, the computing device 102 may include any type of input device for receiving user input, such as a joystick. In other embodiments, the computing device 102 may include any type of haptic or tactile feedback device, such as a vibration generating mouse, or a force feedback device such as a force feedback joystick. Also, the computing device 102 may include any type of sound producing I/O device such as any suitable sound card. The computing device 102 may include other suitable conventional I/O peripherals.

For installing software programs, the computing device 102 may support any suitable device readable medium 116, such as a CD-ROM, DVD-ROM floppy disks, tape device, USB device, hard-drive, or any other suitable device. The computing device 102 may further comprise a storage device 108, such as a hard-drive or CD-ROM, for storing an operating system and other related software. The present invention of a state diagram modeling environment 120 may comprise software that is installed via a device readable medium 116 and stored in the storage device 108. Additionally, the operating system and state diagram modeling environment 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

Figure 2A:
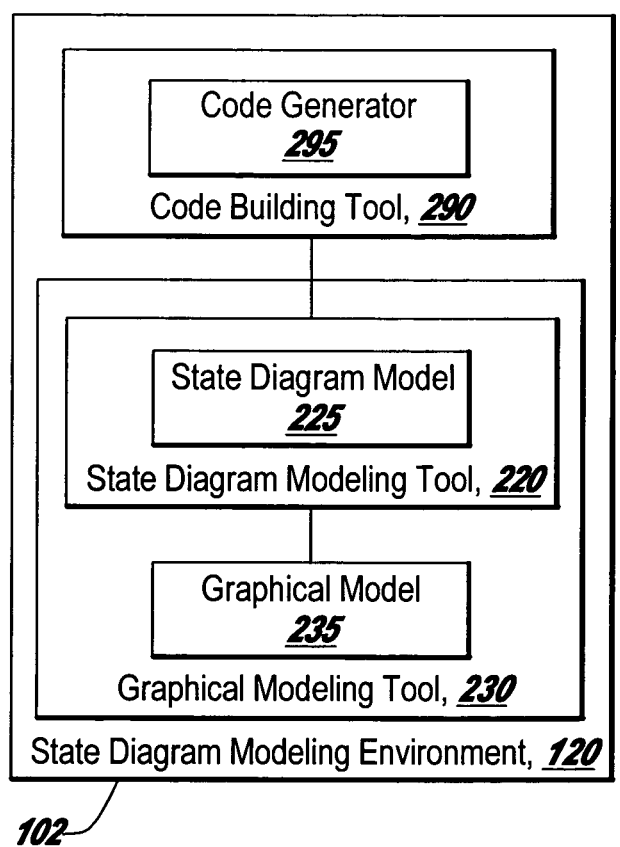
FIG. 2A is a block diagram of an illustrative state diagram modeling environment for practicing an embodiment of the present invention on the computing device of FIG. 1.

In one aspect, the present invention is related to a state diagram modeling environment 120 as illustrated in FIG. 2A. In brief overview, the illustrative state diagram modeling environment 120 includes a state diagram modeling tool 220, a graphical modeling tool 230, and a code building tool 290. The state diagram modeling tool 230 provides an environment for the design, development, testing, simulation, and execution of a state diagram model 225. The graphical modeling tool 230 provides an environment for the design, development, testing, simulation, and execution of a graphical model 235, such as a block diagram model. The graphical modeling tool 230 may also provide for incorporating or referencing a state diagram model 225 via the graphical model 235. The code building tool 290 may include a code generator 295 to provide for the code generation and building of executable forms of the state diagram model 225 and/or graphical model 235. The state diagram modeling tool 220 may be in communication with the graphical modeling tool 230 via any suitable type and form of interface. The code building tool 290 may be in communication with or otherwise have any suitable type and form of interface to the state diagram modeling tool 220 and/or the graphical modeling tool 230.

The illustrative state diagram modeling tool 220 of the present invention comprises a design and development environment for creating any type and/or form of state diagram model 225, which may also be referred to as a state machine diagram model, a state diagram, a state chart or chart. In an exemplary embodiment and by way of example, the state diagram modeling tool 220 may comprise Stateflow® by The MathWorks, Inc. of Natick, Mass. In the exemplary embodiment of Stateflow®, the state diagram model 225 may be referred to as a Stateflow chart. Stateflow® integrates with graphical modeling tools, such as Simulink® by The MathWorks, Inc. of Natick, Mass., to model, simulate, and analyze systems. In one embodiment, Stateflow® provides for the design and development of deterministic, supervisory control systems in a graphical environment. The state diagram modeling tool 220 provides for state machine representation, flow diagram notations, and state-transition diagrams all in the same diagram model 225.

A state diagram model 225 may comprise a graphical representation of a state machine, such as either a finite state machine or a non-deterministic state machine, where states and transitions form the building blocks of a system. As known to those ordinarily skilled in the art, a state machine is a representation of an event driven system where the system makes a transition from one state to another state provided any conditions associated with the transition are met. A state may be a mode of behavior that can be either active or inactive based on inputs, outputs, transitions, and conditions. A transition links one state to another state and may have a condition, such as any logic, computation, algorithm, or executable instruction, used to determine if and when a transition between states may occur. In some embodiments of the state diagram model 225, any of the states may be specified to have either a parallel (AND) or an exclusive (OR) decomposition with respect to any sub-states associated with a state, such as in the illustrative embodiment of Stateflow® as the state diagram modeling tool 220. A state with a parallel decomposition may comprise one or more sub-states that are active at the same time when the state is active and/or another sub-state is active. For example, one or more selected sub-states may be active in parallel or at the same time when the state is active. A state with an exclusive decomposition may comprise only one sub-state that is active when the state is active. One ordinarily skilled in the art will recognize and appreciate how states and sub-states may be specified or configured to operate in a parallel or exclusive manner.

In another embodiment of the present invention, a truth table, graphical or otherwise, may be used to represent the relationships between inputs, outputs, states, transitions, and conditions of a finite state machine. Although generally discussed herein as a graphical state diagram model, one ordinarily skilled in the art will recognize and appreciate that any type of graphical state model may be used and that any type of state machine, such as a finite, non-deterministic, or a virtual state machine may be used in practicing the present invention. Additionally, the state diagram modeling tool 220 and/or state diagram model 225 may use any type and/or form of notation for state machine representation, such as any notation known by those ordinarily skilled in the art, or any notation suitable for practicing the operations of the present invention.

The state diagram modeling tool 220 may provide elements such as states, junctions, and functions, such as graphical functions of Simulink® and/or Stateflow®, that may be placed and arranged graphically in a window, design area or otherwise collectively in a state diagram model 225. States and junctions may be connected together in the state diagram model 225 to form flows and transitions for an implementation of a state machine. The state diagram modeling tool 220 and/or state diagram model 225 may provide for parallelism in that two or more orthogonal states may be active at the same time. Additionally, the state diagram modeling tool 220 and/or state diagram model 225 may provide a mechanism for specifying transitions and/or conditions based on historical information related to execution of the state diagram model 225. Additionally, the state diagram modeling tool 220 and/or state diagram model 225 may use any type and/or form of graphical element to visually represent elements, such as for state machine representation, in a state machine diagram model 225

In some embodiments, the state diagram modeling tool 220 and/or state diagram model 225 may provide for the use of temporal operators. In the exemplary embodiment of Stateflow®, temporal operators provide logic and Boolean operators that operate on recurrence counts of Stateflow® events, such as those provided by input signals to the state diagram model 225 or otherwise created by the operations or logic of the state diagram model 225. For example, Stateflow® provides for the temporal operators of after, before, at and every to include in a state diagram model 225. By way of illustration, the after operator has a syntax of "after (n, E)", where E is the base event for the operator and n is an integer value or expression that evaluates to an integer value. The after operator is true if the base event E has occurred n times since activation of its associated state. Otherwise, it is false. If the chart 225 has no input events, after (n, wakeup) or after (n, tick)) operator evaluates to true after the chart 225 has woken up n times. The tick and wakeup keywords specify an implicit event and are used to generate a local event when the chart 225 of the action being evaluated awakens. The following example illustrates use of the after operator in a transition expression: CLK[after(10, CLK) && temp==COLD]. This example provides a transition out of an associated state only if there has been 10 occurrences of the CLK event since the state was activated and the temp data item has the value COLD.

In a further example of a temporal operator, the before operator has the following syntax "before (n, E)", where the operator is true if the base event E has occurred less than n times since activation of its associated state. In a chart 225 with no input events, for example, the before (n, wakeup) or before (n, tick) operator evaluates to true before the chart has woken up n times. In another example of a temporal operations, the syntax for the every operator is "every (n, E)." The every operator is true at every nth occurrence of the base event E since activation of its associated state. The every (n, wakeup) or every (n, tick)) evaluates to true in a chart 225 with no input events and whenever the chart wakes up an integer multiple n times. In another example, the at operator has a syntax of at (n, E) and is true only at the $n^{th}$ occurrence of the base event E since activation of its associated state. In a chart 225 with no input events, at (n, wakeup) or at (n, tick)) evaluates to true when the chart wakes up for the $n^{th}$ time. Although temporal operators are generally described in an exemplary embodiment of Stateflow®, one ordinarily skilled in the art will recognize and appreciate that temporal operators may be expressed in many different forms, including having other temporal operations and may be provided in other languages and environments.

Furthermore, the state diagram modeling tool 220 may provide for organizing, incorporating, and referring subcharts, hierarchically or otherwise, into a state diagram model 225. For example, a first state diagram model 225' representing a portion of an overall state machine design may be incorporated into or referenced by a top level state diagram model 225. The state diagram model 225 may be organized hierarchically into any number and/or levels of state diagram models to represent a finite state machine.

Although the state diagram modeling tool 220 is generally discussed in view of Stateflow®, one ordinarily skilled in the art will recognize and appreciate the various forms and types of state diagram modeling tools that may be used in practicing the operations of the present invention as described herein. In some embodiments, the state diagram modeling tool 220 may comprise any type and/or form of Petri net modeling and simulation tool. For example, the state diagram modeling tool 220 may comprise any of the Petri modeling and simulation libraries or tools manufactured by Dynasim AB of Lund, Sweden. The state diagram model 225 may comprise a visual formalism or graphical model 235 representing a Petri net model or system. As one ordinarily skilled in the art will recognize and appreciate, a Petri net is a graphical and mathematical modeling tool that provides a mathematical expression of discrete distributed systems and may be expressed in terms of places, transitions, and arcs that connect them. Petri nets may be used to describe and model systems that may be characterized as being concurrent, asynchronous, distributed, parallel, nondeterministic, and/or stochastic. Additionally, tokens or tickets are used in Petri nets to simulate the dynamic and concurrent activities of systems. Accordingly, the state diagram model 225 may comprise any type and/or form of constructs and elements representing a Petri net model, such as a place, a transition, an arc, a token or a ticket as one ordinarily skilled in the art would recognize and appreciate.

In some embodiments, the state diagram modeling tool 220 may comprise any type and/or form of event modeling and simulation tool, such as any discrete, continuous or hybrid event simulation system. For example, the state diagram modeling tool 220 may comprise any of the event modeling and simulation tools manufactured by Imagine That, Inc. of San Jose, Calif., or Simul8 Corporation of Boston, Mass. Accordingly, the state diagram model 225 may comprise a visual formalism or graphical model representing a continuous, discrete, or event modeling system. As one ordinarily skilled in the art will recognize and appreciate, an event modeling tool 220 and diagram model 225 may represent system behavior that can be expressed in terms of what a system does in correspondence to an event or a certain number of event types, and may use model constructs or elements representing queues and/or servers. For example, in a state diagram model 225, a queue element may represent a queue of events, and a server element may represent an event server that processes events from the queue.

Additionally, in some embodiments, the state diagram modeling tool 220 may be able to execute the state diagram model 225. For example, in the exemplary embodiment of Stateflow®, the state diagram modeling tool 220 has a graphical execution and debugging environment that provides a user control of the simulation execution of the state diagram model 225, and access to debug related tasks, such as setting breakpoints. Additionally, the state diagram modeling tool 220 may display information about the state machine, such as active and inactive states during execution or other information as requested or desired by the user.

In some embodiments, the state diagram modeling tool 220 is included in, integrated with, or is otherwise associated with a graphical modeling tool 230. The graphical modeling tool 230 of the present invention provides a graphical modeling environment for creating, designing, simulating, testing, and verifying a graphical model 235, such as a block diagram model. In an exemplary embodiment, the graphical modeling tool 230 includes the graphical modeling environment of Simulink® from the MathWorks, Inc. of Natick, Mass. In the graphical modeling tool 230, configurable and customizable functional blocks are used to create block diagram models that may represent a design, or algorithm, for a control system, a signal processing system, a communication system, any other time-varying or dynamic system or any computational hardware device. In other embodiments, the state diagram modeling tool 220 is separate from the graphical modeling tool 230 but is otherwise interfaced or in communication with the graphical modeling tool 230.

The graphical model 235 of the present invention can comprise any type and/or form of graphical model 235. The graphical modeling tool 230 may provide any type of tools, libraries, and configuration mechanisms to graphically create and/or edit a graphical model 235. In an exemplary embodiment, the graphical model 235 may comprise a block diagram model provided by the Simulink® environment of The MathWorks, Inc. For example, the block diagram model 235 may comprise a series of different type of blocks arranged in a desired manner and connected via connection lines to represent signal values traversing the blocks. The graphical model 235 may comprise any type of element to form a graphical model, such as connectors, blocks, or any other graphical form and representation of functionality supported by the graphical modeling tool 230. One ordinarily skilled in the art will recognize and appreciate the various forms of graphical models, and the elements and content thereof.

In one embodiment, the graphical model 235 incorporates, references, or otherwise uses the state diagram model 225 provided by the state diagram modeling tool 220. In an exemplary embodiment, Stateflow® is integrated and used with Simulink® to provide an environment combing state diagram modeling of Stateflow® with the graphical modeling of Simulink®. The graphical model 225 can include any elements provided for creating a graphical model 225 by the graphical modeling tool 230, such as any elements of a block diagram model known by those ordinarily skilled in the art, and can include a state diagram model 225, or any portion thereof, that may be provided by the state diagram modeling tool 220. For example, the graphical model 235 may comprise a block diagram model with blocks connected as inputs and/or outputs of the state machine diagram 225.

In one embodiment, the graphical modeling tool 230 may be able to simulate or execute the graphical model 235. For example, in the exemplary embodiment of Simulink®, the graphical modeling tool 230 has an environment that provides for the simulation and debugging of the graphical model 225. Additionally, in other embodiments, the graphical modeling tool 230 may generate code of executable instructions representing the graphical model 235 to compile and build for executing on a target hardware platform and/or operating system. As such, the graphical model 225 and/or state diagram model 220 can be processed into an executable form to simulate, run, or otherwise execute the design, functionality, and/or operations represented by the graphical model 225 and/or state diagram model 220. An executable form of the graphical model 225 and/or state diagram model 220 may be any type and/or form of representation of the graphical model 225 and/or state diagram model 220 that can be simulated, run or executed, and may comprise any graphical and/or textual forms, interpreted languages or scripts, or programming languages, or any combination thereof. In some embodiments, the executable form of the graphical model 225 and/or state diagram model 220 may comprise any type of interpreted language, such as MATLAB®. In other embodiments, the executable form of the graphical model 225 and/or state diagram model 220 may comprise any type of executable instructions, such as scripts, libraries, or compiled executables.

The state diagram modeling environment 120 may include a code building tool 290 for generating code and building an executable form of the graphical model 235 and/or state diagram model 220. The code building tool 290 comprises a code generator 295, such as the automatic code generator of Real-Time Workshop® from The MathWorks, Inc. of Natick, Mass. The code generator 295 generates source code from a graphical model 235 and/or state diagram model 220 to translate the functionality of the graphical model 235 and/or state diagram model 220 into a program that may be designed to run on any processor, operating system, or otherwise customized to run on a specific target hardware platform.

The state diagram modeling tool 220, graphical modeling tool 230, and code building tool 290 and any portion thereof, can comprise an application, module, service, computer program, software component, library, or any other type and/or form of executable instruction which is designed to and capable of executing the functionality of the present invention as described herein. Additionally, state diagram modeling tool 220, graphical modeling tool 230, and code building tool 290, may be configured to and capable of running any of the modules, libraries or software components of the MATLAB® and/or Simulink® product family. As such, the state diagram modeling environment 120 may have all or a portion of the software components of MATLAB® and/or Simulink® installed on the computing device 102, or alternatively, accessible from another computing device on a network.

In FIG. 2A, although the state diagram modeling tool 220, graphical modeling tool 230, and code building tool 290 are illustrated as separate tools, one ordinarily skilled in the art will recognize and appreciate that any combination or all of these tools 220, 230 and 290 may be combined into a single application, or otherwise tightly integrated to present a single application in performing the operations of the present invention as described.

Figure 2B:
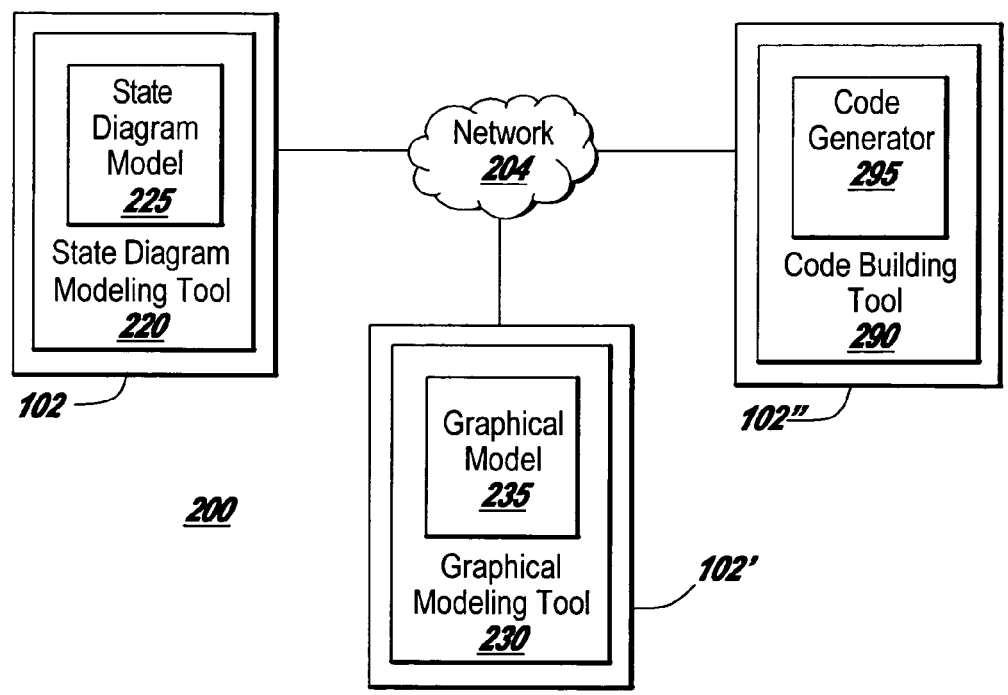
FIG. 2B is a block diagram of another illustrative state diagram modeling environment for practicing an embodiment of the present invention in a network environment.

FIG. 2B depicts another environment suitable for practicing an illustrative embodiment of the present invention, wherein portions of the present invention are distributed in a network environment. In a broad overview, a system 200 depicts a network 204 environment for running portions of the state diagram modeling environment 120 of the present invention on multiple computing devices 102, 102' and 102". The system 200 includes multiple computing devices 102, 102', and 102" connected to and communicating over a network 204. The state diagram modeling tool 220, graphical modeling tool 230, and code building tool 290 can be capable of and configured to communicate to each other over the network 204 by any suitable means and/or mechanisms. In some embodiments, the state diagram modeling environment 120 may use the MATLAB® Distributed Computing Toolbox and Distributed Computing Engine to distribute and process any portions of the operations of the present invention described herein.

The network 204 can be a local area network (LAN), such as a company Intranet, a metropolitan area network (MAN), or a wide area network (WAN) such as the Internet. In one embodiment (not shown), the network 204 comprises separate networks, which may be of the same type or may be of different types. The topology of the network 204 over which the computing devices 102, 102', 102" communicate may be a bus, star, or ring network topology. The network 204 and network topology may be of any such network 204 or network topology capable of supporting the operations of the present invention described herein.

The computing devices 102, 102', and 102" can connect to the network 204 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

The network 204 and network connections may include any transmission medium between any of the computing devices 102, 102', and 102" such as electrical wiring or cabling, fiber optics, electromagnetic radiation or via any other form of transmission medium capable of supporting the operations of the present invention described herein. The methods and systems of the present invention may also be embodied in the form of computer data signals, program code, or any other type of transmission that is transmitted over the transmission medium, or via any other form of transmission, which may be received, loaded into, and executed, or otherwise processed and used by a computing device 102, 102' and 102" to practice the operations of the present invention as described herein.

Each of the computing devices 102, 102', and 102" may be configured to and capable of running any portion of the state diagram modeling environment 120. The state diagram modeling environment 120 and/or any portion thereof, such as the state diagram modeling tool 220, graphical modeling tool 230, and code building tool 290 can be capable of and configured to operate on the operating system that may be running on any of the computing devices 102, 102', and 102". Each computing device 102, 102', and 102" can be running the same or different operating systems. Additionally, state diagram modeling tool 220, graphical modeling tool 230, and code building tool 290 can be capable of and configured to operate on and take advantage of different processors of any of the computing devices 102, 102', and 102". One ordinarily skilled in the art will recognize the various combinations of operating systems and processors that can be running on any of the computing devices.

Figure 2C:
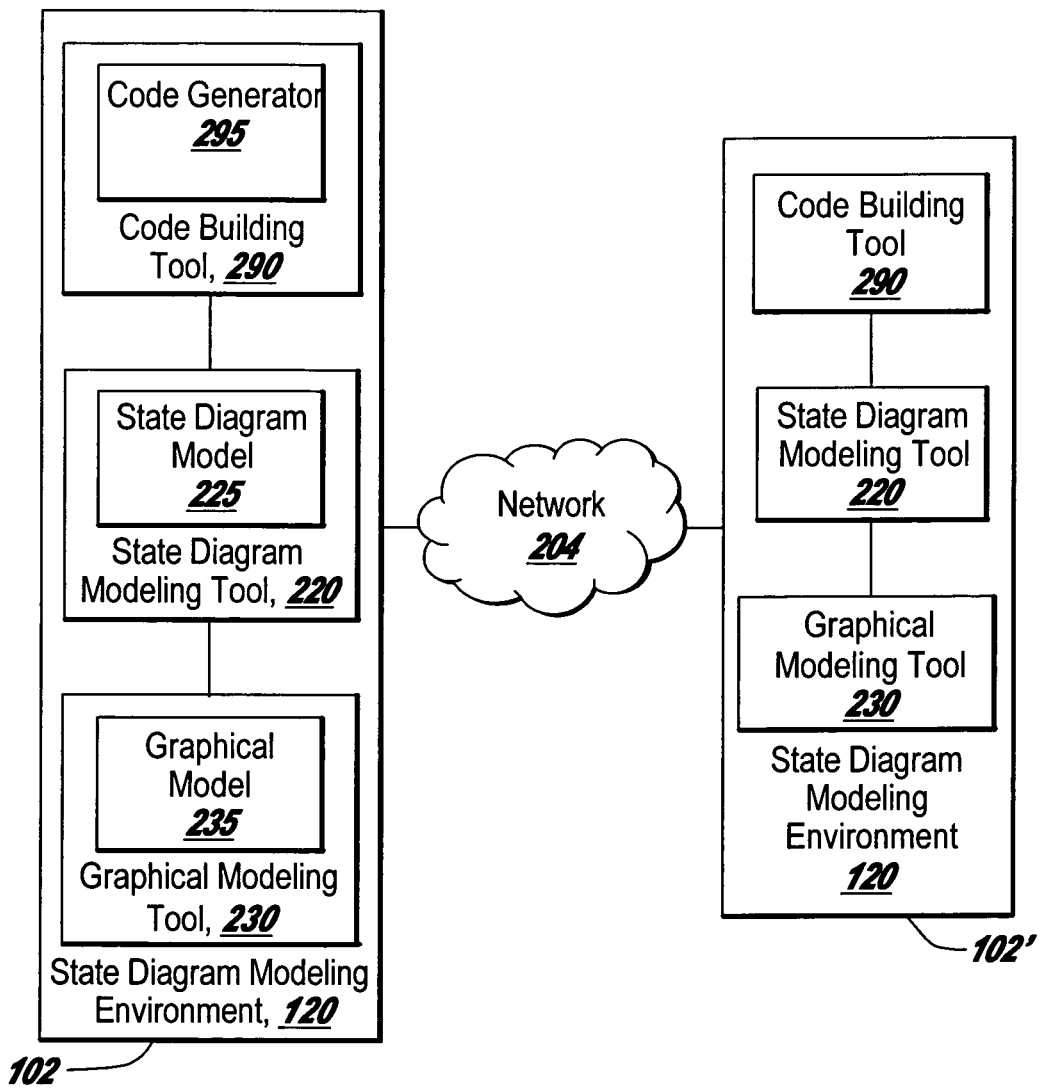
FIG. 2C is a block diagram of another illustrative state diagram modeling environment for practicing an embodiment of the present invention in a distributed environment.

FIG. 2C depicts another illustrative environment of an embodiment of the present invention, wherein portions of the present invention are practiced in a client/server architecture in a network environment. In a broad overview, the illustrative state diagram modeling environment 120 of the present invention includes a client computing device 102 connected to and in communication with a server computing device 102' over a network 204. The state diagram modeling tool 220, graphical modeling tool 230 and/or code building tool 290, can be capable of and configured to have respective portions run on each of the client 102 and the server 102'. In one embodiment, the state diagram modeling tool 210 may have a first portion running on the client 102 and a second portion 210' running on the server 102'. For example, the state diagram modeling tool 210 may have a client portion 210 on the client 102 for providing and displaying the state diagram model 225, and a server portion 210' on the server 102' that may include application functionality and other processing, such as storing and/or retrieving portions of the state diagram model 225 from a database. Likewise, in other embodiments, the graphical modeling tool 230 may also have a client portion 230 and a server portion 230', and the code building tool 290, a client portion 290 and a server portion 290'. One ordinarily skilled in the art will recognize and appreciate how the state diagram modeling tool 220, graphical modeling tool 230, and/or code building tool 290 may be capable of and configured to execute with a client portion and a server portion in a client/server architecture.

Additionally, the state diagram modeling tool 220, graphical modeling tool 230, and/or code building tool 290 may be deployed such that portions of the graphical model 235 and/or state diagram model 225 may execute on certain portions of the network 204 and/or on certain computing devices 102, 102', or 102". For example, some functionality of the graphical model 235 and/or state diagram model 225 may be time critical or sensitive, and therefore may be targeted to execute on a computing device 102, 102' and 102" and a segment or portion of the network 204 with desired performance and/or operating characteristics. Other functionality of the graphical model 235 and/or state diagram model 225 may not be time-sensitive and may be targeted to be deployed to any computing device 102, 102', and 102" available on the network 204.

In summary, the state diagram modeling tool 220, graphical modeling tool 230, and code building tool 290 may be deployed across a wide range of different computing devices, different operating systems, and different processors. Furthermore, the state diagram modeling tool 220, graphical modeling tool 230, and code building tool 290, may be deployed in various distributed and/or client/server environments in various network topologies and configurations.

Figure 3A:
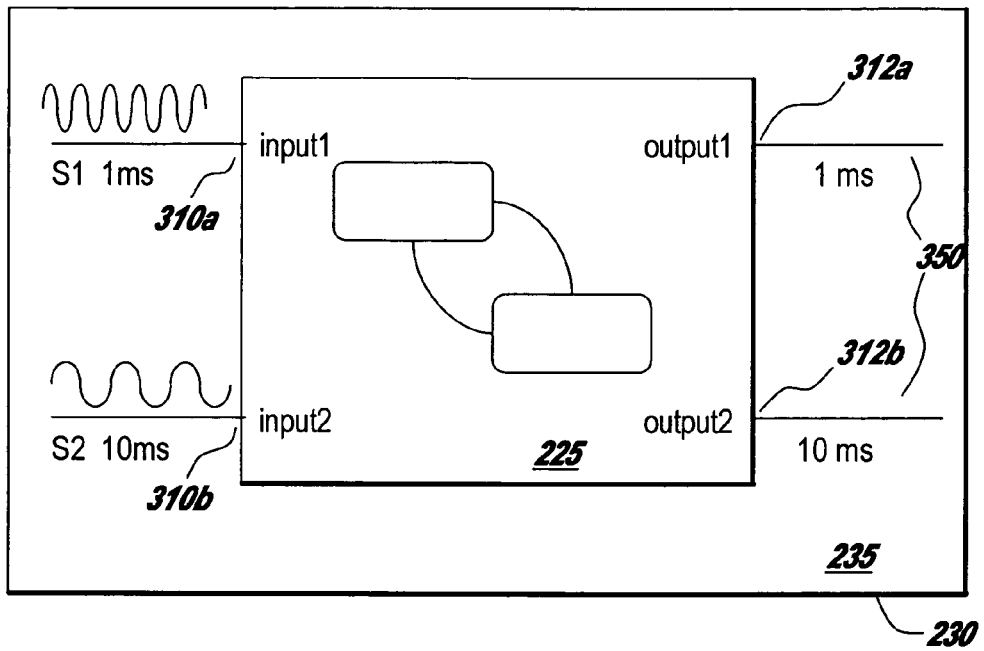
FIG. 3A is a is a diagrammatic view of an illustrative state diagram model having multiple input signals for practicing an embodiment of the present invention
Figure 3B:
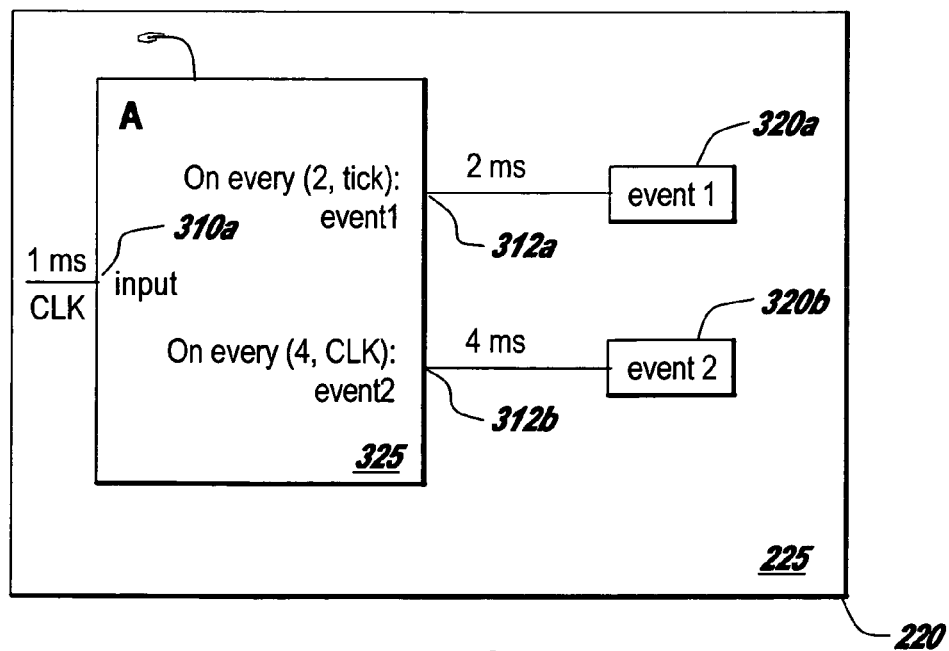
FIG. 3B is a diagrammatic view of an illustrative state diagram model using temporal operators for practicing another embodiment of the present invention.
Figure 3C:
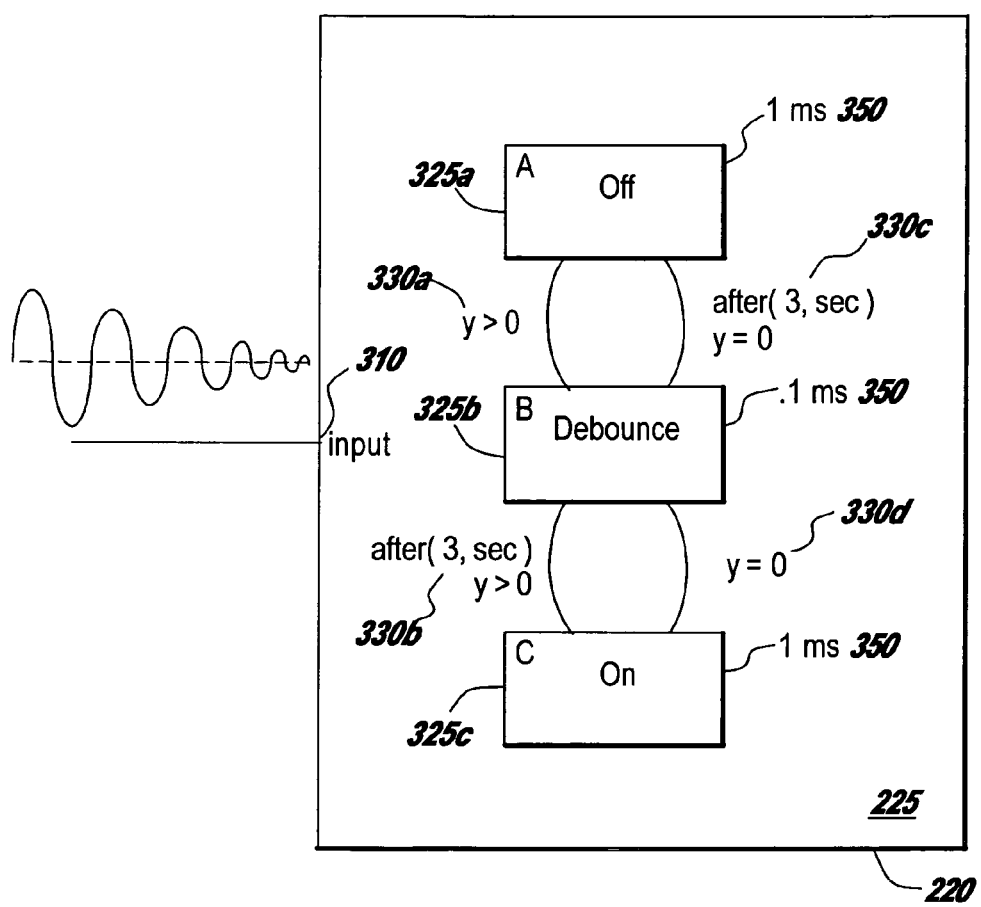
FIG. 3C is a diagrammatic view of an illustrative state diagram model assigning sample rates to states for practicing another embodiment of the present invention.

In one aspect, the present invention is directed towards techniques for providing multiple sample rates in a state machine diagram model 225. FIGS. 3A, 3B, and 3C depict illustrative state diagram models 225 for providing multiple sample rates in accordance with the present invention. FIG. 3A illustrates a graphical model 235 incorporating a state diagram model 225 and having input signals with different sampling rates. FIG. 3B illustrates a state diagram model 225 using temporal operators to provide for the calling of an output function at a frequency specified according to the temporal logic. FIG. 3C illustrates a state diagram model 225 assigning different sample rates to states of the model.

Referring now to FIG. 3A, a graphical model 235 is illustrated in the graphical modeling tool 230. The graphical model 235 incorporates, references, or otherwise uses a state diagram model 225 to provide a portion of the desired functionality. The graphical model 235 may receive or otherwise provide one or more input signals, such as a first input signal 310a, referred to as input 1 in FIG. 3A, and a second input signal 310b, referred to as input 2 in FIG. 3A. Signal 310a may provide a sample rate of 1 ms while the signal 310b may provide a different sample rate of 10 ms. The output signals 312a and 312b, referred to as output 1 and output 2 respectively in FIG. 3A, may provide input to other functionality and/or operations associated with the graphical model 235. The output signal 312a may have a sample rate of 1 ms, or any multiple of 1 ms, and likewise, the output signal 312b may have a sample rate of 10 ms or any multiple of 10 ms.

Using the techniques of the present invention, the graphical model 235 may have the input signals 310a-301b propagate or traverse the state diagram model 225 and generate, produce, or otherwise provide the output signals 312a and 312b. The output signals 312a and 312b may provide a plurality of sample rates 350 as input to other elements of or associated with the graphical model 235. A signal as used herein will be in reference to signals used in the graphical modeling tool 210 of Simulink®, although one ordinarily skilled in the art will appreciate that other graphical modeling environments 210 may have other representations for signal functionality as described herein. Signals represent streams of information, such as data, data types, values, timing information, and control information, flowing into, out of, and between various elements in the graphical model 235.

Signals can be specified with a wide range of attributes including signal name, data type (e.g., 8-bit, 16-bit, or 32-bit integer), numeric type (complex or real), and dimensionality. A signal type refers to a signal that is a member of a class or classes of signals. Additionally, a signal can be associated with, assigned, or specified with a sample rate. For example, a sample rate of a source element can be specified or configured in the graphical model 235, such as a source block of a block diagram model. The graphical modeling tool 230 may propagate or otherwise provide for the traversal of the signal's sample rate through other elements in the graphical model 235, and using the techniques of the present invention as discussed in detail below, have the signal's sample rate propagated via the state diagram model 225.

Although the illustrative embodiments of the present invention are generally discussed in regards to a plurality of sample rates, the sample rates of the present invention may comprise any type and/or form of execution rate, data rate, or rate or frequency of propagation, triggering, or other activity with respect to the graphical model 235 and/or state diagram model 225. As such, the sample rates of the present invention may represent any type and/or form of sampling, frequency, or rate of the flow of information, such as data and signals, or any type and/or form of sampling, frequency, or rate of execution, such as the triggering of any events or function calls.

Referring now to FIG. 3B, a state diagram model 225 using temporal operators is illustrated. A state diagram model 225 may be provided by the state diagram modeling tool 220 to include a state block 325 representing at least a portion of the functionality of the model or the desired state machine representation. The state block 325 may receive a 1 ms input signal 310a as input and referred to as a CLK signal in FIG. 3B. The state block 325 may include temporal operators 335a and 335b to perform operations according to the temporal logic to provide output signals 312a and 312b. The illustrative temporal operator 335a calls an output function "event 1", represented by block 320a, via output signal 312a based on every second occurrence of the state 325 waking up. The illustrative temporal operator 335b calls an output function "event 2", represented by block 320b, via output signal 312b based on every fourth cycle of the input signal CLK 310a.

As illustrated in FIG. 3B, the output signals 312a-312b provided by the temporal operators 335a-335b represent multiple different sample rates 350 propagating via the state diagram model 225. Although the state block 325 receives a single input signal 310a at a certain sample rate, the logic of the temporal operators 335a-335b provide different sampling rates 350 as output 312a-312b to drive, trigger, or otherwise provide input to the event functions 320a-320b.

Referring now to FIG. 3C, a state diagram model 225 providing sample rates assigned to states is illustrated. The state diagram model 225 illustrates an example "debounce" logic that may be used to represent and handle the transient effects of a physical switch being switched to an on or off state. As known to those ordinarily skilled in the art, a typical switch may makes multiple transitions during the time to open or close the switch, due to effects that include age, operating inertia, mechanical design, and the condition of the switch-contact surfaces. This behavior may be referred to as "switch bounce." In brief overview, the state diagram model 225 comprises an off state 325a, a debounce state 325b and an on state 325c along with corresponding temporal operators 330a, 330b, 330c, and 330d. An input signal 310 provides a signal with a sampling rate as input to the state diagram model 225. The off state 325a corresponds to an input signal value, i.e., a y value, of less than or equal to zero while the on state 325c corresponds to a y value greater than zero. The debounce state 325b is designed to correspond to the transient effects of a signal of a switch that occurs between the off state 325a and on state 325c, in which the y value may bounce between the on and off state multiple times before reaching a steady state.

In the illustrative example of FIG. 3C, the off state 325a and on state 325c may each be assigned a sample rate of 1 ms while the debounce state 325b may be assigned a different sample rate of 0.1 ms. For example, the debounce state 325b may have a faster sampling rate than the other states as the transient of the input signal switching between the off an on state may occur quickly. As such, the state diagram model 225 has multiple sample rates 350 assigned to multiple states 325a-325c.

As illustrated by the examples of FIGS. 3A-3C, a state diagram model 225 may be sample rate aware and have multiple samples rates 350 associated with it via one or more of the following: 1) one or more input signals with different sample rates, 2) temporal logic operators providing different and/or multiple sampling rates, and 3) one or more states having assigned sample rates. The multiple sample rates 350 associated with the state diagram model 225 may be formed via any combination of the above techniques. For example, a state diagram model 225 may have two input signals with different samples rates, a state with an assigned sample rate, and/or a temporal operator effectively providing a different sampling rate based from an input signal sample rate, internal clock event, or a state assigned sample rate.

Although the illustrative state diagram models 225 of FIGS. 3A-3C are generally described and illustrated as provided by a state diagram modeling tool 220 such as Stateflow®, the state diagram model 225 may comprise other types of graphical models and visual formalisms provided by any other type and/or form of visual or graphical modeling tool. As such, the state diagram model 225 may comprise constructs and elements, graphical or otherwise, relevant to the type and/or form of state diagram model 225 and/or state diagram modeling tool 220. One ordinarily skilled in the art will recognize and appreciate how the techniques of the present invention described herein would be applied using a state diagram model 225 provided via any suitable state diagram modeling tool 220.

In another aspect, the illustrative embodiment of the present invention provides systems and methods for processing and/or propagating multiple sample rates 350 associated with a state diagram model 225. The techniques of the present invention will be discussed in view of illustrative method 400 of FIG. 4B in conjunction with the illustrative state diagram model 225 of FIG. 4A, and the illustrative intermediate representation of FIG. 4C.

Figure 4A:
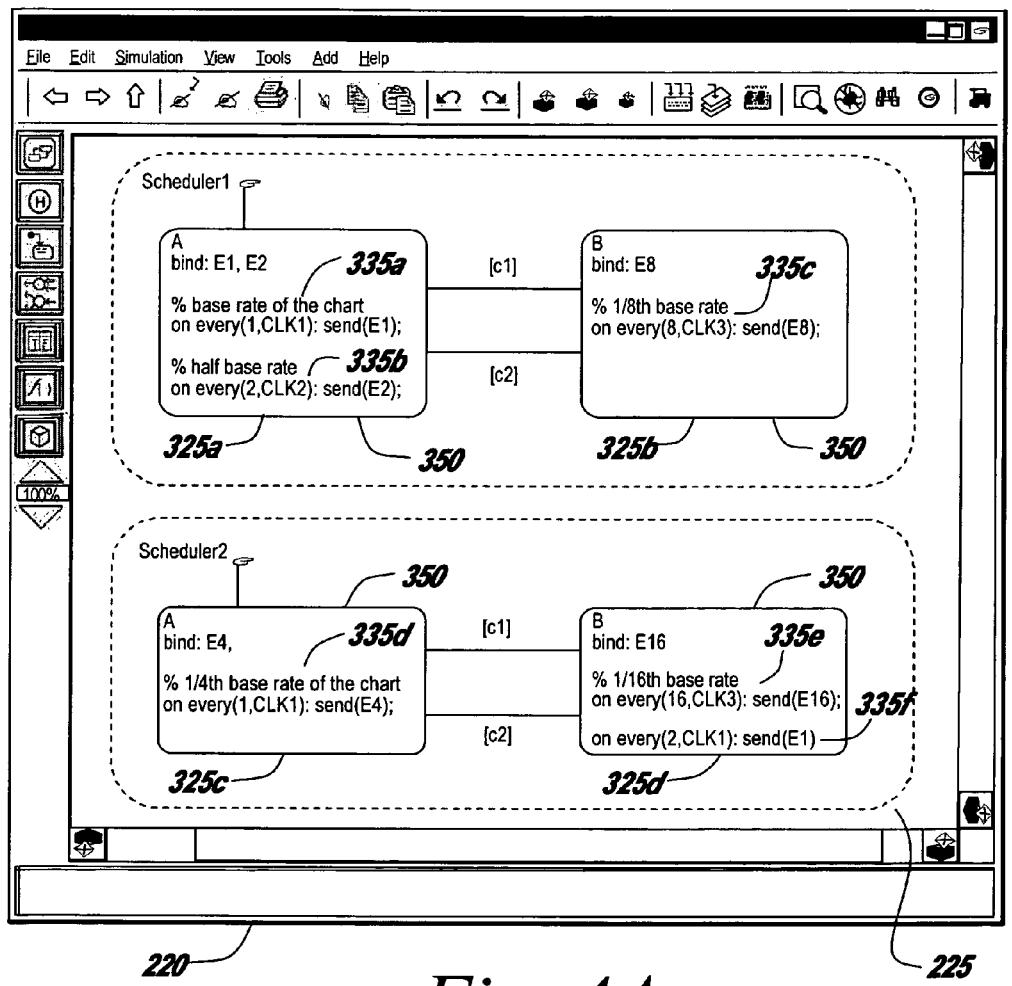
FIG. 4A is a diagrammatic view of another illustrative state diagram model for practicing an embodiment of the present invention.

In brief overview, FIG. 4A illustrates a state diagram model 225 in an exemplary embodiment of a state diagram modeling environment 220 of Stateflow®. The state diagram model 220 has two parallel Scheduler states, "Scheduler1" and "Scheduler2", having exclusive or, "XOR", substates 325a-325d that define temporal operators to broadcast output events, e.g., via a send function call, at sample rates that are multiples of samples rates provided via input clock events "CLK1", "CLK2" and "CLK3". Scheduler1 state includes substate A 325a with temporal operators 335a and 335b, and substate B 325b with temporal operator 335c. The Scheduler2 state includes a substate A 325c with temporal operator 335d, and a substate B 325d with temporal operators 335e and 335f. As such, the temporal operators 335a-335d provide multiple samples rates 350 to be considered for processing the state diagram model 225. As illustrated in the logic of states 325a-325d, a bind statement may be used as known to those ordinarily skilled in the art to synchronize the enabling and disabling of the connected function-call subsystems in a graphical model 235 with the activity of the bound states.

Figure 4B:
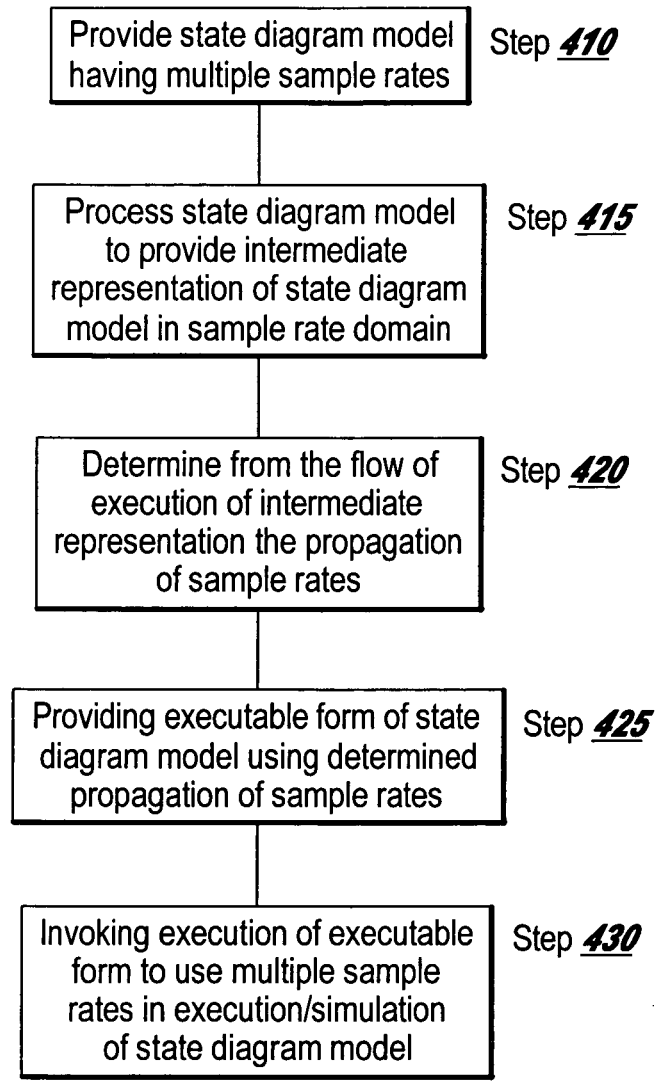
FIG. 4B is a flow diagram depicting an illustrative method for practicing an embodiment of the present invention to process the state diagram model of FIG. 4A.

FIG. 4B depicts illustrative method 400 for processing and propagating multiple samples rates 350 associated with a state diagram model 225 and in conjunction with any of the illustrative environments of the present invention depicted in FIGS. 2A-2C. As such, the techniques of the present invention, or any portion thereof, may be practiced in the state diagram modeling tool 220, graphical modeling tool 230, and/or the code building tool 290. The technique of the present invention uses an intermediate representation, such as a directed graph or a control flow graph, to determine how to propagate the multiple signals 350 via the state diagram model 225. The intermediate representation reduces the state diagram model 225 to a sample-rate-space representation, which provides a structure, mechanism, and means for determining sample time propagation.

At step 410 of illustrative method 400, a state diagram model 225 having multiple sample rates 350, such as the state diagram model 225 illustrated in FIG. 4A, is provided in any suitable form. In one embodiment, the state diagram model 225 may be provided via a file in any format readable by the state diagram modeling tool 220 or graphical modeling tool 230. In another embodiment, the state diagram model 225 may be available in memory, such as in one or more data structures or memory elements used by the state diagram modeling tool 220 or graphical modeling tool 230 to work with, use, or otherwise process the state diagram model 225. In a further embodiment, the state diagram model 225 may be included in, incorporated with, associated or otherwise provided with a graphical model 235. One ordinarily skilled in the art will recognize and appreciate that the state diagram model 225 may be provided in various forms and/or mediums in practicing the operations of the present invention described herein.

At step 415 of illustrative method 400, the state diagram model 225 may be processed to determine the propagation of the one or more sample rates 350. In one embodiment, the state diagram model 225 is processed to propagate any signals traversing the elements of the model, including the sample rate of the signals. In another embodiment, the state diagram model 225 is compiled or otherwise processed to generate an executable form of the model. In one embodiment, the executable form of the state diagram model 225 may be provided in an interpreted language, and in another embodiment, as compiled source code.

During model compilation or model processing, the state diagram modeling tool and/or graphical modeling tool 230, such as through a model compiler, uses a process called signal propagation to represent the traversal of the signal and associated attributes via the connectivity of the blocks. Signal propagation may be used for creating the executable form of the state diagram model 225 and/or graphical model 235 to simulate the behavior of the signal through the elements of the state diagram model 225 and/or graphical model 235. As such, the propagation of signal attributes through the connectivity represented in the state diagram model 225 and/or graphical model 235 drive the execution of the simulation. In reference to an exemplary embodiment of Simulink® as the graphical modeling tool 230 and Stateflow® as the state diagram modeling tool, signal propagation is the process used to determine attributes of signals and blocks, such as data types, labels, sample time, dimensionality, and so on, that are determined by connectivity. The techniques of the present invention allow the propagation of multiple sample rates via a state diagram model 225.

Although the present invention may be generally discussed as determining the sample rate propagation in association with a model compilation process, the state diagram model 225 may be processed to determine sample time propagation at any suitable time, such as a pre-compilation step, or as an ad-hoc step. For example, a user may select to determine the sample rate propagation of a model via a user interface of the state diagram modeling tool 220 or graphical modeling tool 230.

Figure 4C:
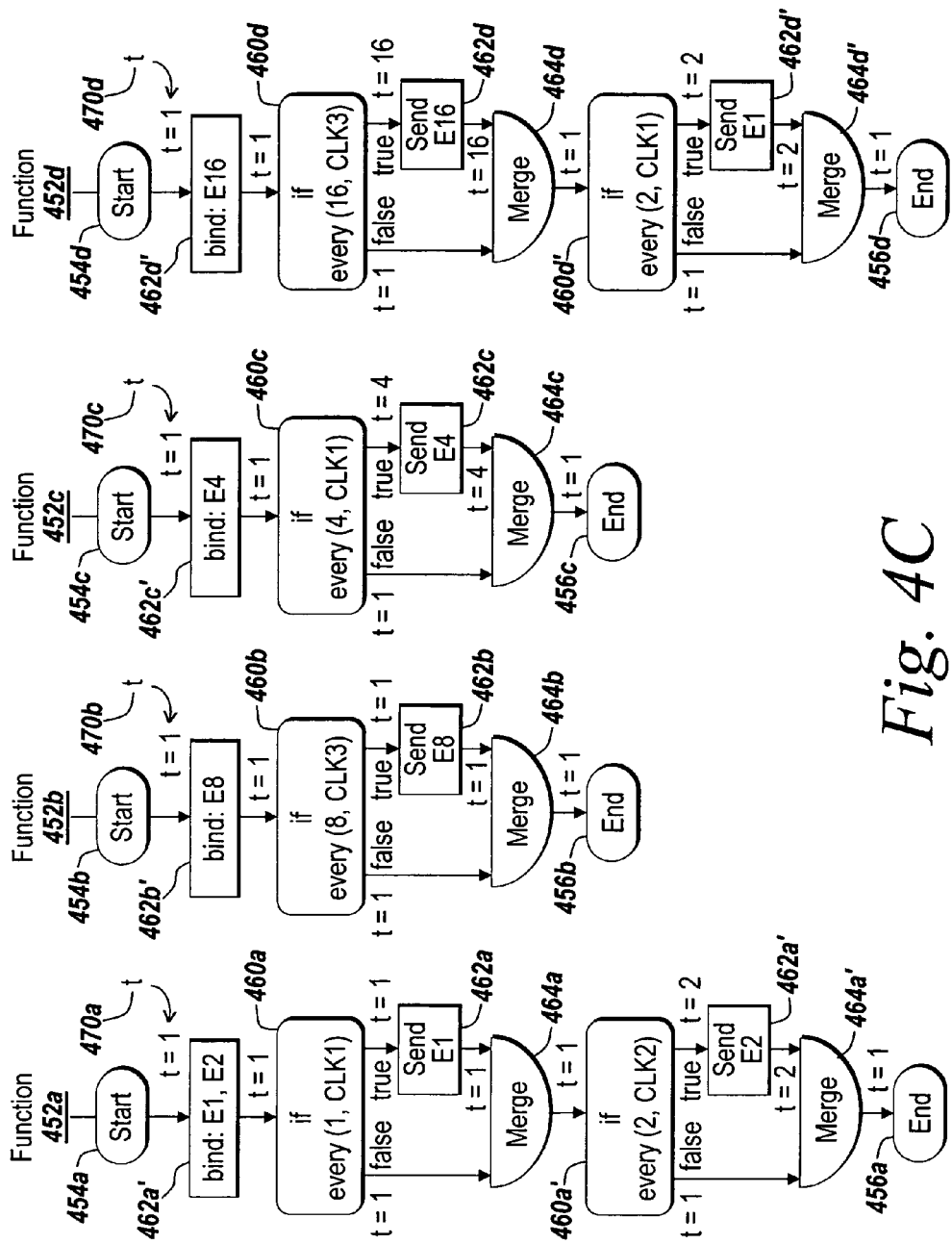
FIG. 4C is a diagrammatic view of an illustrative intermediate representation of the state diagram model of FIG. 4A for practicing the techniques of the present invention.

Still referring to illustrative step 415 of method 400 in FIG. 4B, an intermediate representation of the state diagram model 225 is generated, or otherwise provided to determine sample time propagation of multiple sample rates 350 via the state diagram model 225. FIG. 4C illustrates an intermediate representation of the state diagram model 225 of FIG. 4A. In the illustration of FIG. 4C, the intermediate representation is depicted as a unidirectional directed graph 450, although other types of graphs and/or tree structures may be used. The graph 450 provides an abstract and static representation of the procedures and/or operations of the state diagram model 225. In one embodiment, the graph 450 represents all alternatives of control flow. So, for example, both paths of an IF statement may be represented in the graph 450. In brief overview, the illustrative graph 450 is represented by a set of objects called vertices or nodes, connected by links or lines called edges or arcs, which may also have associated directions. As such, a graph 450 may be depicted as a set of nodes (i.e., vertices) connected by lines (i.e., edges), with an arrowhead on a line representing a directed edge.

The graph 450 may comprise various primitives or constructs to represent a procedural, operation or flow of the state diagram model 225, such as functions and nodes. As illustrated in FIG. 4C, a function 452a-452d may be used to represent the flow of each state or substate of the state diagram model 225. For example, function 452a represents the substate A 352a of Scheduler1 as depicted in FIG. 4A. Each function 452a-452d has a start node 454a-454d, which is a virtual node or specially designated node to identify the start of the function 452a-452d, and control entry into the flow of the graph for the function 452a-452d. Each function 452a-452d also has an end node 456a-456d which is a virtual node or specially designate node to indicate the end of the function 452a-452d and control exiting or leaving the flow of the graph 450. As such, each function 452a-452d is identified by a pair of start nodes 454a-454d and end nodes 456a-456d.

Also, the graph 450 has nodes to represent conditionals and basic blocks of execution or flow. For example, conditional nodes 460a-460d' in graph 450 represent conditional logic associated with each temporal operator 335a-335f in the state diagram model 225 of FIG. 4A. Nodes 462a-462d' in graph 450 represent a basic block or a straight-line piece of procedural or operational flow without any jumps in control flow or execution, such as jump to start a function or another node, or to end a function. For example, a node 462a may be used to represent the execution of a send function based on the execution of an "on every" function. As such, nodes 460a-460d' and 462a-462d' represent single-entry-single exit nodes. As illustrated in FIG. 4C, directed edges or lines are used to connect the nodes in the graph 450 and represent jumps in the control of flow from start node to single-entry-single-exit nodes to the end node.

Additionally, the graph 450 may have other constructs to represent other aspects of the control of flow, such as a merge node 464a-464d' as illustrated in FIG. 4C. A merge node 464a-464d' may be used to connect two or more edges from other nodes. For example, a conditional node 460a-460d' may provide a true flow edge and a false flow edge to represent flow paths depending on the evaluation of the conditional. At a point in the control of flow represented by the function 452a-452d, the flow of control may merge together and a merge node 464a-464d' is used to merge two edges received as input into one edge provided as output from the merge node 464a-464d'. In a similar manner, a split node (not shown) may receive a single edge as input and provide two or more edges as output.

Although the intermediate representation is illustrated in FIG. 4C as a directed graph 450, one ordinarily skilled in the art will recognize and appreciate that any type and/or form of suitable graph or intermediate representation may be used in practicing the techniques of the present invention described herein. For example, in some embodiments, a control flow graph, a tree structure graph, or matrix may be used. As such, the intermediate representation 450 may comprise constructs and elements, graphical or otherwise, relevant to the type and/or form of intermediate representation 450. One ordinarily skilled in the art will recognize and appreciate how the techniques of the present invention described herein would be applied using an intermediate representation 450 provided in a form other than as illustrated in FIG. 4C.

By way of example, the functions 452a-452d illustrated in FIG. 4C will be discussed in relation to the representation of the control of flow for the respective states 325a-325d illustrated in FIG. 4A. Function 452a represents the control of flow for substate A 325a of Scheduler1 of the state diagram model 225. Function 452a provides a start node 545a which flows into node 462a'' representing the "bind: E1, E2" instruction. Node 462a'' flows into conditional node 460a representing the "on every (1, CLK1)" instruction 335a, which flows into a true and false edge. If the instruction 335a is evaluated to be true or otherwise is to be executed, the node 460a flows via the true edge into node 462a to represent the "send (E1)" instruction. The false edge from the node 462a'' and the edge from 462a merge at merge node 464a, which flows into a second conditional node 460a' representing the second "on every" instruction 335b of the state 325a. If the conditional of node 460a' is true, the true edge flows into node 462a' which represents the "send (E2)" instruction. Otherwise, the false edge from node 460a' flows into merge node 464a' with the flow from node 462a'. The merge node 464a' then flows into end node 456a.

Function 452b represents the control flow of state block 325b. The start node 54b flows into the node 462b' representing the bind instruction of the state 325b. Node 462b' flows into the conditional node 460b representing the temporal operator "on every" instruction 335c. The true edge of the conditional node 460b flows into node 462b to represent the "send (E8)" instruction, and the flow from node 462b merges with the false edge of the conditional node 460b at merge node 464b. The merge node 464b then flows into end node 456b to complete the control of flow for function 452b.

In a similar manner as function 452b, function 452c represents the control of flow of stare block 325c of state diagram model 225 illustrated in FIG. 4A. Node 462c' represents the bind instruction while node 460c represents the temporal operator instruction 335d. If the temporal operator is triggered, the true edge flows into node 462c representing the corresponding send instruction. The false edge of node 460c and the flow from node 462c merge at the merge node 456c, which in turns flows into end node 456c to complete the function 452.

Likewise, in a similar manner as function 452a, function 452d represents state block 325d of state diagram model 225 illustrated in FIG. 4A. State block 325d has a bind instruction followed by two temporal operators 335e and 335f. The corresponding function 452d of graph 450 represents the bind instruction with node 462d'' which flows into node 460d representing the first temporal operator 335e. On the true edge, node 462d represents the send instruction corresponding to the first temporal operator 335c, which flows into the first merge node 464d to merge with the false edge of node 460d. The merge node 460d flows into node 460d' representing the second temporal operator 335f. Node 460d' flows into node 462d' and the merge node 464d' for the true and false edges respectively. The output flow of node 462d also flows into the merge node 464d' to merge with the false path of node 460d'. The merge node 464d' flows into the end node 456d to represent the end of the flow of control for the function 452d.

In view of the example illustrations of functions 452a-452d of the graph 450, one ordinarily skilled in the art will recognize and appreciate applying the intermediate representation of a state diagram model 225 to other state diagram models 225 having less or more states 325a-325d with various and different instructions, including different types of temporal operators. For example, the intermediate representation 450 may be generated to provide a unidirectional directed graph representation of any type and/or form of state diagram model 225 provided via the exemplary embodiment of Stateflow® as the state diagram modeling tool 220.

In continuing at step 415 of illustrative method 400, the graph 450 of FIG. 4C provides a static representation of the control of flow of the state diagram model 225 that can used to analyze and determine the propagation of samples rate via the elements of the state diagram model 225. At illustrative step 420, the propagation of sample rates can be simulated, analyzed, and determined via the graph 450. In one embodiment, a time variable 470a-470d may be assigned to each function 452a-452d to assess changes in the sample rate by any node as the time variable propagates the flow of the graph 450. The time variable 470a-470d may represent the sample rate of any input signal, a state, an input event, or a temporal operation. In some embodiments, the time variable 470a-470d may represent the sample rate of an internal clock of the state diagram model 225 or the function call input events from a graphical model 225, such as "CLK1", "CLK2", and "CLK3" events illustrated in FIG. 4A in an exemplary embodiment of Stateflow® as the state diagram modeling tool 220 and Simulink® as the graphical modeling tool 230. In other embodiments, the time variable represents a signal of Simulink® propagating via the elements of the state diagram model 225.

In another embodiment, the time variable 470a-470d may represent an initial value, such as a normalized value of 1, 100, or 1000, that indicates a multiplier for a sample rate. For example, the time variable 470a-470d may initially be set to a value of 1, and further representing any unit of time. As the time variable 470a-470d propagates via the static representation of the graph 450, the time variable may be increased or decreased according to the functionality, logic, procedure or operations represented by each node. The resulting time variable 470a-470d may indicate a multiplier of the actual sample rate of a corresponding input, such as an input signal or input event.

In some embodiments, each output function, signal, or event of the state diagram model 225 may be assigned a sample rate based on the value of the time variable 470a-470d at the point in the graph 450 triggering or causing the output activity. In some embodiments, the slowest or lowest common sample rate may be used for any portion of the graph 450, such as any output function. For example, if an output function E1 is called multiple times within a function 452a-452d, the lowest sample rate to be propagated through a node calling function E1 may be selected as the sample rate to use in the executable form of the state diagram model 225.

By way of example, the propagation of a sample rate represented by a time variable 470a-4670d will be discussed in connection with the illustrative graph 450 of FIG. 4C. At each edge or connecting line of the graph, a value for the time variable 470a may be determined to represent the propagation of a sample rate. A time variable 470a initially set to 1 may be assigned at the start 454a of function 452a. As the time variable 470a propagates the node 462a", the bind operations of node 462a" does not change or alter the time variable 470a as it does not perform any temporal or time related operations. As such, the value of the time variable 470 at the point of flow output from node 462a" remains set to 1. After traversing node 460a representing the conditional of the temporal operator 335a, the time variable 470a may have a value for the false edge and the true edge. Since the false edge does not change the sample rate, the time variable 470a remains set to 1. On the true edge, the time variable is set to a value representing the change to sample rate from the temporal operator 335a. Since the temporal operator indicates a trigger on every occurrence of the input event "CLK1", the time variable 470a is set to or otherwise remains at 1. As such, the node 462a representing the send E1 instruction is associated with a time variable 470a set to 1.

The input flows to the merge node 464a both have a time variable 470a value of 1. Therefore, the time variable 470a of 1 is passed to node 460a' to determine changes in sample rate via the control of flow of the second temporal operator 335b of state 325a. In some embodiments, the fastest sample rate representation is passed via the merge node 464a. In other embodiments, the lowest common sample rate or slowest sample rate may be passed as output by the merge node 464a. For the false edge output of node 460a', the time variable 470a remains unchanged and set to a value of 1. For the true edge output of node 460a', the time variable 470b is set to 2 to represent that the temporal operator 335b is executed on every second occurrence of the input event CLK2. The merge node 464a' is provided a time variable 470a of 1 and time variable 470a of 2 from the false and true edges, respectively. The time variable 470a may be set to the fastest rate of 1 to the next edge which terminate the flow of control via the end node 456a.

In view of the analysis of the values of the time variable 470a propagated via the static representation of the graph 450, the output function E1 may be called at a sample rate of 1 times the CLK1 input event or for every occurrence of the CLK1 input event, and the output function E2 at a sample rate of every second occurrence of the CLK2 input event or half the sample rate of the CLK2 input event. With the determination of the propagation of the sample rates 350 through the state diagram model 225, an executable form of the state diagram model 225 may be generated or otherwise provided to execute using the determined samples rate 225.

In another example of step 420 of illustrative method 400, the propagation of the time variable 470b is determined for function 452b representing the state 325b of the state diagram model 225 of FIG. 4A. An initial value of 1 is set for time variable 470a for propagating from the start block 454b. For the example, the time variable 470b may represent a sample rate of 1 ms of the input event CLK3, or input signal, or assigned to the state block 325b. Node 462b' does not alter the time variable 470b setting, and on the false edge of conditional node 460b the time variable 470b flows unchanged to the merge node 464b. On the true edge output of node 460b, the time variable 470b is set to a value of 8 to represent that on the $8^{th}$ occurrence of the input event CLK3, the "send E8" instruction will be executed. As such, the send E8 output function has a sample rate of ⅛ th of the sample rate of CLK3.

In a similar example, the propagation of the time variable 470c via the function 452c provides a time variable 470c value of 4 assigned to the execution of the instruction "send E4" represented by node 462c. The time variable 470c is set to a value of 1 for the flows through the other connecting lines of function 452c. Via the analysis of the values of the time variable 470c, the sample rate for the output function call of "send E1" is ¼$^{th}$ the sample rate of the corresponding CLK1 event.

In a further example illustrated in FIG. 4C, the time variable 470d is propagated via the flows and nodes of the function 452d of graph 450. In accordance with the temporal operations of nodes 462d and 462d', the time variable 470d is set to a value of 16 for the "send E16" instruction of node 462d and a value of 2 for the "send E1" instruction of node 462d'. As such, the "send E16" output function is assigned a sample rate of 1/16$^{th}$ of the sample rate of CLK3 or otherwise on every 16$^{th}$ occurrence of CLK3. In the case of the "send E1" instruction, this is the second occurrence of this output function as the "send E1" output function is also represented by node 462a of function 452a. In some embodiments, in order to assign a common sample rate to each of these calls to the same function, the lowest common or slowest sample rate is used. By this example, the time variable 470a is set to 1 for the first instance of the output function represented by node 462a in function 452a and time variable 470d is set to 2 for the second instance of the output function represented by node 463. The second instance has the lower sample rate of ½ the sample rate of input event CLK1 and is assigned as the sample rate for all output function calls to E1 in graph 450. In other embodiments, each instance of the output call to function E1 may be assigned the propagated sample rate corresponding to their use in the respective functions 452a and 452d.

In some embodiments, the propagation of a time variable 470a-470d through a function 452a-452d represents the propagation of one input signal of a plurality of input signals, such as input signal 310a of state diagram model 225 illustrated in FIG. 3A. A second propagation of a time variable 470a-470d may be performed to determine the sample rate corresponding to a second input signal, such as input signal 310b illustrated in FIG. 3A. For example, the state block 325a represented by function 454a may be associated with input signals 310a and 310b. From the sample rate propagation analysis of illustrative step 420 for each input signal 310a-310b, the lowest sample rate assigned to node 460a calling output function E1 may be used for the executable form of the state diagram model 225.

At step 425 of illustrative method 400, an executable form of the state diagram model 225 is generated or otherwise provided using the sample rates determined via the static representation of the graph 450 at step 420. In this manner, the executable form represents the sample-rate aware state diagram model 225. In one aspect, the executable form is generated from the graph 450 representation of the state diagram model 225, such as the illustrative graph 450 of FIG. 4C representing the illustrative state diagram model 225 of FIG. 4A. By reducing the reactive, event-based, and sample-time aware state diagram model 225 to a static representation, such as a directed graph 450, code can be generated to represent the static representation and the determined sample times, such as the sample times determined via the techniques illustrated at step 420. Additionally, for output signals, functions, or events being triggered or driven by the state diagram model 225 and associated with multiple and/or different sample rates 350, the techniques of the present invention reduce the state diagram model 225 to a static representation using a suitable sample rate, e.g. least common or lowest sample rate, for the output signal, function, or event. The techniques of the present invention provide efficient code representation of a sample rate aware state diagram model 225.

In one embodiment, source code is generated to reflect the static representation of the state diagram model 225 with the determined sample rates. The source code may be compiled and linked to generate an executable. An illustrative embodiment of the present invention to generate code for the state diagram model 225 comprising the multiple sample rates will be discussed in further detail below in conjunction with FIGS. 5A and 5B. In another embodiment, an interpretive language, such as MATLAB®, may be used to represent the state diagram model 225 with the determined sample rates in executable form. For example, the interpretive language may be used to simulate the state diagram model 225 in the state diagram modeling tool 220. One ordinarily skilled in the art will recognize and appreciate that the executable from of the state diagram model 225 may take many forms using a variety of languages, such as programming and interpretive languages.

At step 430 of illustrative method 400, the present invention is related to executing an executable form of the state machine diagram model 225, either in an interpretative mode or in the accelerated mode. In interpretative mode, either the state diagram modeling tool 220 and/or graphical modeling tool 230 can execute a state diagram model 225 and/or graphical model 235 incorporating the state diagram model 225 in their respective environments in a graphical fashion. In other embodiments, code can be generated from the state diagram model 225 and/or graphical model 235 to build an executable program for the accelerated mode of executing the model 225. The execution of the executable form of the state diagram model 225 uses the sample rates determined via the static intermediate representation 450 as illustrated in the techniques of step 420.

Figure 5A:
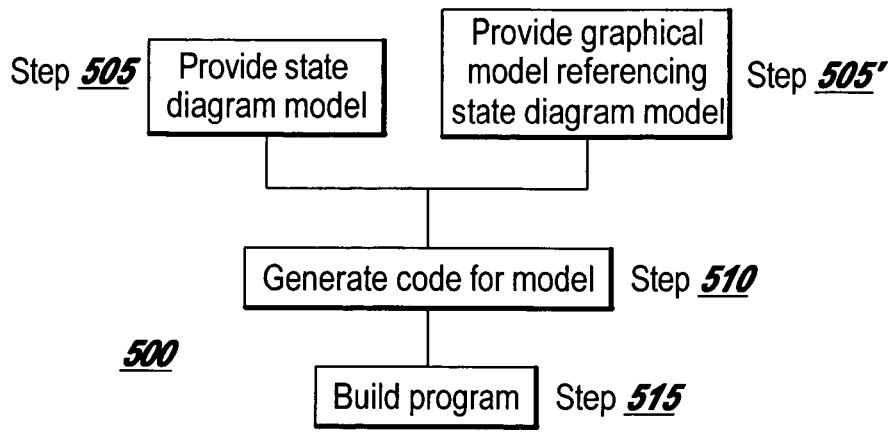
FIG. 5A is a flow diagram depicting an illustrative method for practicing an embodiment of the present invention to generate code for an illustrative state diagram model.
Figure 5B:
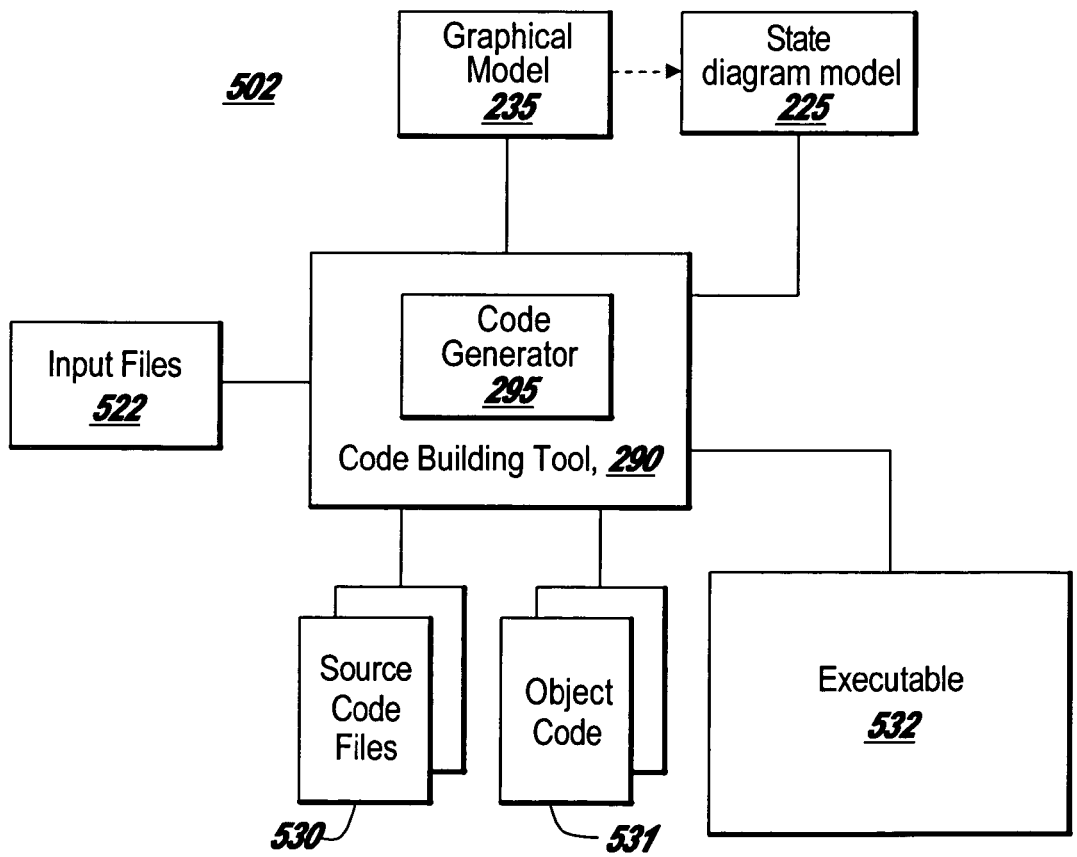
FIG. 5B is a block diagram of an illustrative code generation system for practicing an embodiment of the present invention.

Referring now to FIGS. 5A and 5B, an illustrative method 500 of FIG. 5A and system 502 of FIG. 5B of the present invention will used to discuss the operations, functions, and structure of the code generation techniques of the present invention. Referring to FIG. 5B, in brief overview, the code generating system 502 comprises a code building tool 290 having a code generator 295. In an exemplary embodiment of a state diagram modeling environment 120 of Stateflow® and Simulink®, the code building tool 290 comprises the Stateflow® Coder integrated with Real-Time Workshop®, both manufactured by The Mathworks, Inc.

Referring to FIG. 5A, the illustrative method 500 of the present invention obtains either a state machine diagram model 225 at step 505, or in another embodiment, a graphical model 235 referencing the state machine diagram model 225 at step 505'. In some embodiments, the state machine diagram model 225 and/or the graphical model 235 may be obtained via a file. The state machine diagram model 225 and/or the graphical model 235 may comprise a file in a format that the code building tool 290 or code generator 295 can read and that follows a file specification for defining state machines and other elements of the state machine diagram model 225. In other embodiments, the code building tool 290 and/or code generator 295 may obtain either the state machine diagram model 224 and/or the graphical model 235 from an application programming interface (API) call to another application or via an interface to another environment, such as the state diagram modeling tool 210. In yet a further embodiment, the graphical mode simulation tool 230 and/or the state diagram modeling tool 210, or another computer program, saves and converts the state machine diagram model 225 and/or graphical model 235 into a format readable by the code building tool 290. For example, a graphical model 235 produced with Simulink® and Stateflow® may be converted into an intermediate model file representation such as an .rtw type file readable by the automatic code generator of Real-Time Workshop®.

At step 510 of illustrative method 500, the code building tool 190, such as Stateflow® Coder and/or Real-Time Workshop®, will generate code for the graphical model 235 and/or state machine diagram model 225. The code building tool 290 and code generator 295 use one or more input files 522 in conjunction with reading and processing the graphical model 235 and/or state machine diagram model 225.

The one or more input files 522 may comprise files including templates, commands, input parameters, configuration data, source code, data and class definitions, component configuration, device driver or any other information that may be used by the code generator 295 to generate code for the graphical model 235 and/or state machine diagram model 225. The input files 522 may include files to provide input to and configure the code generator 295 to generate source code files 530 for a specific target hardware platform, for example, a specific processor. In an exemplary embodiment of Real-Time Workshop® as the code generator 295, Real-Time Workshop® uses target language compiler script files, with a .tlc file extension, as input files 522 to the code generation process. The .tlc files provide sections of programming instructions to be implemented for block and element references as they may be found in the graphical model 235 and state machine diagram model 235 during the code generation process. The .tlc files also can provide data and class definitions for data element references found in the graphical model 235 and/or state machine diagram model 225. Additionally, the .tlc files also comprise compiler directives, built-in functions and other code generation commands to direct Real-Time Workshop® during the code generation process.

In operation, the code generator 295 reads in information regarding or a representation of the graphical model 235 and/or state machine diagram model 225 and uses the input files 522 to generate code by translating the graphical model 235 and/or the state machine diagram model 225 into one or more source code files 530. By way of example, the automatic code generation can be discussed in terms of generating code with Real-Time Workshop® from a block model diagram 215 generated with Simulink®. Simulink® creates and stores block diagram models 235 into model files with an .mdl file extension. As part of the code generation process, Real-Time Workshop® reads in an .mdl model file and analyzes the model to generate an intermediate model file with an .rtw extension. This intermediate .rtw model file comprises a hierarchical structure of records describing systems and their blocks and connections analyzed from a block diagram model 235 of the .mdl file.

In one embodiment, the code building tool 290 and/or code generator 295 performs the techniques depicted in steps 415, 420 and 425 of illustrative method 400 to generate code for the state diagram model 225. As such, the code building tool 290 and/or code generator 295 may reduce the state diagram model 225 into a static representation and perform sample time propagation analysis via the static representation to provide the code for the executable form. In one embodiment, the code building tool 290 performs the techniques of the present invention when generating the intermediate model .rtw file In another embodiment, the code building tool 290 may perform the techniques of the present invention when processing the generated .rtw file to provide code.

A language compiler called the target language compiler of Real-Time Workshop® works with .tlc files and .rtw files to produce code. The target language compiler interprets a program that reads the intermediate model file description of an .rtw file. As the target language compiler encounter a record in the .rtw file, it uses directives in the .tlc files corresponding to the record to direct the code generation process for the specific record. As such, the target language compiler works much like a text processor. For example, the target language compiler uses block .tlc files, which specify the particular code for a block, to transform each block into code. When it reads a record in the .rtw file that references a block, the target language compiler applies code from the corresponding block .tlc file to generate code for the block in source code files 522. Additionally, model wide .tlc files are also used to provide input to the target language compiler for global customization of the code. Model wide .tlc files may direct the target language compiler to generate main routines to provide entry points into the program, source code header files to setup data structures, and utility functions to support code for particular blocks. The block and model wide .tlc files can be modified to generate customized code for blocks and to generate any desired global customizations to the code.

The source code files 530 generated from the code generator 295, such as Real-Time Workshop®, may comprise program instructions of a programming language, such as C, which may further be in a format and style following the ANSI/ISO C standard. Additionally, the source code files 530 may be generated to comprise fixed-point or floating-point source code. The programming instructions of the source code files 530 may be generated to run on any real-time operating system or for a specific processor. In a further embodiment, the programming instructions of the source code files 530 may be optimized for performance or versatility, and/or for a specific target hardware platform. In another embodiment, the code generator 295 can be configured via the input files 522 to generate custom source code comprising a style and format as directed by the input files 522. The code generator 295 can be also configured via the input files 522 to provide customized source code to support such customizations as error handling, optimization, code and data reduction, code reusability, scoping of variables, and other characteristics of the source code that may be modified during the source code generation process.

In some embodiments, a portion of the source code 530 or object code 531 generated or provided by illustrative method 500 may be targeted to run on a specific computational hardware device, such as an embedded hardware platform, or a specific processor of a computing device 102 and another portion may be targeted to run on a personal computer, such as a desktop or notebook. For example, a portion of the state diagram model 224 may process data or perform loops that are time critical. In comparison, the display may not need to be updated in a time critical manner as the viewer's eyes may only perceive updates at a certain rate. The time critical data processing or loops may be embodied in source code 530 and/or object code 531 targeted for a specific processor of a certain speed or capability and the non-time critical code 530, 531 may be targeted for any general computing device. One ordinarily skilled in the art will recognize and appreciate the various ways to process and target various portions of code to meet the desired functionality and/or execution of the state diagram model 225.

At step 515 of illustrative method 500, one or more programs may be built from the automatically generated code to provide an executable form to execute the state diagram model 225. The code building tool 290 also provides for the building of the source code files 530 into object code 531 to generate one or more programs to run on a target platform and/or operating system. The build process of illustrative step 515 of the present invention may include compiling the code and linking libraries, drivers, and other programs via a make program or some other compiling utility. In one embodiment, the code building tool 290 invokes a compiler provided by software available with the operating system, such as a make utility on a UNIX operating system. In another embodiment, the compiler may be provided from a software development package such as Visual C/C++ from Microsoft Corporation of Redmond, Wash. One ordinarily skilled in the art will recognize the code building tool 290 may invoke any type of compiler that is configured to and capable of translating the source code 530 into object code 531 to be executed by the target computing device 102.

Although the code generator 295 is generally discussed in terms of generating source code, the code generator 295 may provide code in any other form, such as object code, pre-existing source code, or other programmable instructions suitable for representing the functionality of the graphical model 235 and state machine diagram model 225. Additionally, although the illustrative embodiment of the present invention is discussed in terms of source code files 530 and object code 531 from a programming language like C, the code generator 295 may generate any type of programming related output, such as an interpreted programming language and/or scripting language. For example, the code generator 295 may generate code for perl, awk, VBscript, Javascript, tcl, or the technical computing programming language of MATLAB®. In other cases, the code generator 295 may generate output in other types of languages, such as the hardware description language of HDL. One ordinarily skilled in the art will recognize the various types of languages the code building tool may apply in generating code and how the code generator may build the code based on the type of language.

In view of the structure, functions and operations of the systems and methods as described herein, the present invention provides techniques for designing and constructing sample-time aware state diagram models, and processing the state diagram models to provide executable forms incorporating the one or more samples times propagating via the model. The techniques of the present invention reduce state diagram models to a static intermediate representation for sample-time propagation analysis from which code can be generated to provide an executable form. This enables state diagram models to integrate and work with dynamic system models that represent and propagate multiple sample times of different components in a system. Using the present invention, a sample time aware state diagram model can be used to schedule the execution of the different components of a dynamic system model based on sample rate propagation. In additional examples, the techniques of the present invention can be used to implement a sample time aware state diagram model for fault-management systems where the system needs to be woken up at different rates based on whether an error state has been reached or not, or for operating system modeling where task switching is implemented by polling and co-routining.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for processing a state diagram model to propagate a plurality of rates associated with one or more elements of the state diagram model, the method comprising:

providing, using a computing device, an executable state diagram model having one or more elements, the executable state diagram model having a plurality of rates associated with the one or more elements, the plurality of rates having a first rate and a second rate, the plurality of rates comprising one or more of sample rates, execution rates, or data rates; and processing, using the computing device, the executable state diagram model to:

generate, from the executable state diagram model, a static representation of a control flow of the state diagram model, where:

the static representation is a rate-space representation that includes a plurality of time variables, the plurality of time variables represent the plurality of rates, determine how to propagate the plurality of rates via the executable state diagram model based on propagation of the plurality of time variables through the static representation, propagate the plurality of rates via the one or more elements of the executable state diagram model, and provide an executable form of the executable state diagram model, the executable state diagram model including the plurality of rates propagated via the one or more elements of the executable state diagram model.

2. The method of claim 1, comprising providing at least one of the plurality of rates via a portion of a signal provided as an input to the one or more elements of the state diagram model.

3. The method of claim 1, comprising providing an executable instruction associated with the state diagram model to provide at least one of the plurality of rates by changing a frequency of one of a propagation of a signal or a calling of an output function.

4. The method of claim 1, comprising assigning one of the plurality of rates to one or more states of the state diagram model.

5. The method of claim 1, wherein the static representation comprises one of a directed graph or a control flow graph.

6. The method of claim 1, comprising processing the static representation to determine from the plurality of rates a rate to apply for one of an output signal or output function of the state diagram model.

7. The method of claim 1, wherein the first rate is different than the second rate.

8. The method of claim 1, comprising providing the state diagram model via a graphical model that incorporates or references the state diagram model.

9. The method of claim 1, comprising associating a first portion of the state diagram model using the first rate or a second portion of the state diagram model using the second rate with an output to a graphical model.

10. The method of claim 1, comprising processing the state diagram model to provide the executable form by generating code representing the state diagram model and compiling the code into an executable file.

11. A method for executing a state diagram model to propagate multiple rates, the method comprising:

processing, using a computing device, an executable state diagram model to:

generate, from the executable state diagram model, a static representation of a control flow of the executable state diagram model, where:

the static representation is a rate-space representation that includes a plurality of time variables, the plurality of time variables represent multiple rates, determine how to propagate the multiple rates via the executable state diagram model based on propagation of the plurality of time variables through the static representation, propagate the multiple rates via one or more elements of the executable state diagram model, the multiple rates comprising one or more of sample rates, execution rates, or data rates, and provide an executable form of the executable state diagram model, the executable state diagram model including the multiple rates propagated via the one or more elements of the executable state diagram model; and executing, using the computing device, the executable form to use a first rate of the multiple rates for a first portion of the executable form and a second rate of the multiple rates for a second portion of the executable form.

12. The method of claim 11, wherein the processing comprises propagating a first input signal having the first rate and propagating a second input signal having the second rate.

13. The method of claim 11, wherein processing comprises providing one of the first rate or the second rate to one of an output signal or an output function of the state diagram model.

14. The method of claim 11, wherein the one or more elements represent one of a first state assigned the first rate or a second state assigned the second rate.

15. The method of claim 11, wherein the executing the executable form provides a simulation of the state diagram model.

16. The method of claim 11, wherein the first rate is different than the second rate.

17. The method of claim 11, wherein an executable form of a graphical model comprises the executable form of the state diagram model.

18. The method of claim 11, comprising providing an output to a graphical model by executing one of the first portion of the state diagram model using the first rate or the second portion of the state diagram model using the second rate.

19. The method of claim 11, comprising providing the executable form of the state diagram mode by generating code representing the state diagram model and compiling the code into an executable file.

20. A system for processing a state diagram model to propagate a plurality of rates associated with one or more elements of the state diagram model, the system comprising:

a storage to store an executable state diagram model having a plurality of rates associated with one or more elements of the executable state diagram model, the plurality of rates having a first rate and a second rate, the plurality of rates comprising one or more of sample rates, execution rates, or data rates; and a processor to process the executable state diagram model to:

generate, from the executable state diagram model, a static representation of a control flow of the state diagram model, where:

the static representation is a rate-space representation that includes a plurality of time variables, the plurality of time variables represent the plurality of rates, determine how to propagate the plurality of rates via the executable state diagram model based on propagation of the plurality of time variables through the static representation, propagate the plurality of rates via the one or more elements of the executable state diagram model, and provide an executable form of the executable state diagram model, the executable state diagram model including the plurality of rates propagated via the one or more elements of the executable state diagram model.

21. The system of claim 20, wherein the state diagram model comprises a signal having a rate provided as an input to the one or more elements.

22. The system of claim 20, wherein the state diagram model comprises an executable instruction providing one of the plurality of rates by changing a frequency of a propagation of a signal via the one or more elements.

23. The system of claim 20, wherein the state diagram model comprises one or more states assigned one or more of the plurality of rates.

24. The system of claim 20, wherein the static representation comprises one of a directed graph or a control flow graph.

25. The system of claim 20, wherein the processing tool uses the static representation to determine from the plurality of rates a rate to apply for one of an output signal or an output function of the state diagram model.

26. The system of claim 20, wherein the processing tool provides an executable form to use the first rate for a first portion of the executable form and the second rate for a second portion of the executable form.

27. The system of claim 20, wherein the processing tool propagates a first input signal having the first rate and propagates a second input signal having the second rate.

28. The system of claim 20, wherein the processing tool applies one of the first rate or the second rate to one of an output signal or an output function of the state diagram model.

29. The system of claim 20, wherein the one or more elements represent one of a first state assigned the first rate or a second state assigned the second rate.

30. The system of claim 20, wherein the executable form is executed to provide a simulation of the state diagram model.

31. The system of claim 20, wherein the first rate is different than the second rate.

32. The system of claim 20, wherein the state diagram model is provided via a first computing device and the processing tool executes on a second computing device.

33. The system of claim 20, wherein one of a first portion or a second portion of the executable form executes on one of a first computing device or a second computing device.

34. The system of claim 20, wherein an executable form of a graphical model comprises the executable form of the state diagram model.

35. The system of claim 20, wherein an output is provided to a graphical model by executing a first portion of the state diagram model using the first rate or a second portion of the state diagram model using the second rate.

36. The system of claim 20, wherein the processing tool comprises a code generator for generating code representing the state diagram model and compiling the code into an executable file.

37. One or more non-transitory computer readable media storing executable instructions that, when executed on a processing logic unit, cause the processing logic unit to process a state diagram model to propagate a plurality of rates associated with one or more elements of the state diagram model, the non-transitory computer readable media storing one or more instructions for:

providing an executable state diagram model having one or more elements, the executable state diagram model having a plurality of rates associated with the one or more elements, the plurality of rates having a first sample rate and a second sample rate, the plurality of rates comprising one or more of sample rates, execution rates, or data rates; and processing the executable state diagram model to:

generate, from the executable state diagram model, a static representation of a control flow of the executable state diagram model, where:

the static representation is a rate-space representation that includes a plurality of time variables, the plurality of time variables represent the plurality of rates, determine how to propagate the plurality of rates via the executable state diagram model based on propagation of the plurality of time variables through the static representation, propagate the plurality of rates via the one or more elements of the executable state diagram, and provide an executable form of the executable state diagram model, the executable state diagram model including the plurality of rates propagated via the one or more elements of the executable state diagram.

38. The non-transitory computer readable media of claim 37, comprising instructions for providing at least one of the plurality of rates via a portion of a signal provided as an input to the one or more elements of the state diagram model.

39. The non-transitory computer readable media of claim 37, comprising instructions for providing an executable instruction associated with the state diagram model to provide at least one of the plurality of rates by changing a frequency of one of a propagation of a signal or a calling of an output function.

40. The non-transitory computer readable media of claim 37, comprising instructions for assigning one of the plurality of rates to one or more states of the state diagram model.

41. The non-transitory computer readable media of claim 37, wherein the static representation comprises one of a directed graph or a control flow graph.

42. The non-transitory computer readable media of claim 37, comprising instructions for processing the static representation to determine from the plurality of rates a rate to apply for one of an output signal or output function of the state diagram model.

43. The non-transitory computer readable media of claim 37, wherein the first rate is different than the second rate.

44. The non-transitory computer readable media of claim 37, comprising instructions for providing the state diagram model via a graphical model that one of incorporates or references the state diagram model.

45. The non-transitory computer readable media of claim 37, comprising instructions for associating a first portion of the state diagram model using the first rate or a second portion of the state diagram model using the second rate with an output to a graphical model.

46. The non-transitory computer readable media of claim 37, comprising instructions for processing the state diagram model to provide the executable form by generating code representing the state diagram model and compiling the code into an executable file.

47. One or more non-transitory computer readable media storing executable instructions that, when executed on a processing logic unit, cause the processing logic unit to execute a state diagram model to propagate multiple rates, the non-transitory computer readable media storing one or more instructions for:
processing an executable state diagram model to:
generate, from the executable state diagram model, a static representation of a control flow of the executable state diagram model, where:
the static representation is a rate-space representation that includes a plurality of time variables,
the plurality of time variables represent multiple rates,
determine how to propagate the multiple rates via the executable state diagram model based on propagation of the plurality of time variables through the static representation,
propagate the multiple rates via one or more elements of the executable state diagram model, the multiple rates comprising one or more of sample rates, execution rates, or data rates, and
provide an executable form of the executable state diagram model, the executable state diagram model including the multiple rates via one or more elements of the executable state diagram model; and
executing the executable form to use a first rate of the multiple rates for a first portion of the executable form and a second rate of the multiple rates for a second portion of the executable form.

48. The non-transitory computer readable media of claim 47, wherein the processing comprises propagating a first input signal having the first rate and propagating a second input signal having the second rate.

49. The non-transitory computer readable media of claim 47, wherein the processing comprises providing one of the first rate or the second rate to one of an output signal or an output function of the state diagram model.

50. The non-transitory computer readable media of claim 47, wherein the one or more elements represent one of a first state assigned the first rate or a second state assigned the second rate.

51. The non-transitory computer readable media of claim 47, wherein the executing the executable form provides a simulation of the state diagram model.

52. The non-transitory computer readable media of claim 47, wherein the first rate is different than the second rate.

53. The non-transitory computer readable media of claim 47, wherein an executable form of a graphical model comprises the executable form of the state diagram model.

54. The non-transitory computer readable media of claim 47, comprising instructions for providing an output to a graphical model by executing one of the first portion of the state diagram model using the first rate or the second portion of the state diagram model using the second rate.

55. The non-transitory computer readable media of claim 47, comprising instructions for providing the executable form of the state diagram mode by generating code representing the state diagram model and compiling the code into an executable file.

56. A system comprising:
a processor to:
process an executable state diagram model to:
generate, from the executable state diagram model, a static representation of a control flow of the executable state diagram model, where:
the static representation is a rate-space representation that includes a plurality of time variables,
the plurality of time variables represent multiple rates,
determine how to propagate the multiple rates via the executable state diagram model based on propagation of the plurality of time variables through the static representation,
propagate the multiple rates via one or more elements of the executable state diagram model, the multiple rates comprising one or more of sample rates, execution rates, or data rates, and
provide an executable form of the executable state diagram model, the executable state diagram model including the multiple rates propagated via one or more elements of the executable state diagram model and
execute the executable form to use a first rate of the multiple rates for a first portion of the executable form and a second rate of the multiple rates for a second portion of the executable form, and to provide a simulation of the executable state diagram model; and
a storage for storing a result of the simulation of the executable state diagram model.

* * * * *

UNITED STATES PATENT AND TRADEMARK OFFICE
CERTIFICATE OF CORRECTION

PATENT NO.        : 8,464,188 B1
APPLICATION NO.   : 11/210538
DATED             : June 11, 2013
INVENTOR(S)       : Vijay Raghavan et al.

Page 1 of 1

It is certified that error appears in the above-identified patent and that said Letters Patent is hereby corrected as shown below:

In the Specification

Column 16, line 4, after "off" change "an" to --and--

In the Claims

Column 28, line 28 (Claim 13, line 1) insert --the-- before "processing"

Signed and Sealed this
Fifteenth Day of October, 2013

Teresa Stanek Rea
*Deputy Director of the United States Patent and Trademark Office*